United States Patent
Yamashita et al.

(10) Patent No.: US 9,772,964 B2
(45) Date of Patent: Sep. 26, 2017

(54) MULTICORE PROCESSOR SYSTEM, COMPUTER PRODUCT, ASSIGNING METHOD, AND CONTROL METHOD

(71) Applicant: FUJITSU LIMITED, Kawasaki-shi, Kanagawa (JP)

(72) Inventors: Koichiro Yamashita, Hachioji (JP); Takahisa Suzuki, Kawasaki (JP); Hiromasa Yamauchi, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 14/873,015

(22) Filed: Oct. 1, 2015

(65) Prior Publication Data

US 2016/0026587 A1    Jan. 28, 2016

Related U.S. Application Data

(60) Division of application No. 13/752,138, filed on Jan. 28, 2013, now Pat. No. 9,170,965, which is a
(Continued)

(51) Int. Cl.
    *G06F 13/24*    (2006.01)
    *G06F 13/34*    (2006.01)
    (Continued)

(52) U.S. Cl.
    CPC .............. *G06F 13/34* (2013.01); *G06F 1/324* (2013.01); *G06F 1/329* (2013.01); *G06F 9/4812* (2013.01);
    (Continued)

(58) Field of Classification Search
    USPC .................................................. 710/260–269
    See application file for complete search history.

(56) References Cited

U.S. PATENT DOCUMENTS

| 6,205,508 B1 | 3/2001 | Bailey et al. |
| 7,275,122 B2 | 9/2007 | Wright et al. |
| (Continued) | | |

FOREIGN PATENT DOCUMENTS

| JP | 04-33130 A | 2/1992 |
| JP | 63-223860 A | 9/1998 |
| (Continued) | | |

OTHER PUBLICATIONS

European Supplementary Search Report, Applicaton No. 10855322. 3-1957 dated Oct. 4, 2013.
(Continued)

*Primary Examiner* — Raymond Phan
(74) *Attorney, Agent, or Firm* — Arent Fox LLP

(57) ABSTRACT

A multicore processor system includes core configured to detect a process assignment instruction; acquire a remaining time obtained by subtracting a processing time of interrupt processing assigned to an arbitrary core of a multicore processor from a period that is from a calling time of the interrupt processing to an execution time limit of the interrupt processing, upon detecting the process assignment instruction; judge if the remaining time acquired at the acquiring is greater than or equal to a processing time of processing defined to limit an interrupt in the process; and assign the process to the arbitrary core, upon judging that the remaining time is greater than or equal to the processing time of the processing defined to limit an interrupt in the process.

3 Claims, 21 Drawing Sheets

Related U.S. Application Data continuation of application No. PCT/JP2010/062908, filed on Jul. 30, 2010.

(51) Int. Cl.
*G06F 13/26* (2006.01)
*G06F 1/32* (2006.01)
*G06F 9/48* (2006.01)
*G06F 9/50* (2006.01)

(52) U.S. Cl.
CPC ............ *G06F 9/5033* (2013.01); *G06F 13/24* (2013.01); *G06F 13/26* (2013.01); *Y02B 60/1217* (2013.01); *Y02B 60/142* (2013.01); *Y02B 60/144* (2013.01)

(56) References Cited

U.S. PATENT DOCUMENTS

| | | | |
|---|---|---|---|
| 7,444,450 | B2 | 10/2008 | Wright et al. |
| 9,170,965 | B2 * | 10/2015 | Yamashita .............. G06F 13/26 |
| 2005/0229178 | A1 | 10/2005 | Ballantyne |
| 2006/0101465 | A1 | 5/2006 | Kato et al. |
| 2006/0112208 | A1 | 5/2006 | Accapadi et al. |
| 2008/0168201 | A1 | 7/2008 | De Cesare et al. |
| 2013/0111092 | A1 | 5/2013 | Heller et al. |
| 2014/0187185 | A1 | 7/2014 | Winoto et al. |
| 2014/0201411 | A1 | 7/2014 | Kumar et al. |

FOREIGN PATENT DOCUMENTS

| | | |
|---|---|---|
| JP | 2002-342098 A | 11/2002 |
| JP | 2005-285093 A | 10/2005 |
| JP | 2006-134203 A | 5/2006 |
| JP | 2006-344262 A | 12/2006 |
| WO | WO 2007/077516 A1 | 7/2007 |

OTHER PUBLICATIONS

Japanese Office Action issued Dec. 16, 2014. Japanese Application No. 2014-077377, with English Translation.

* cited by examiner

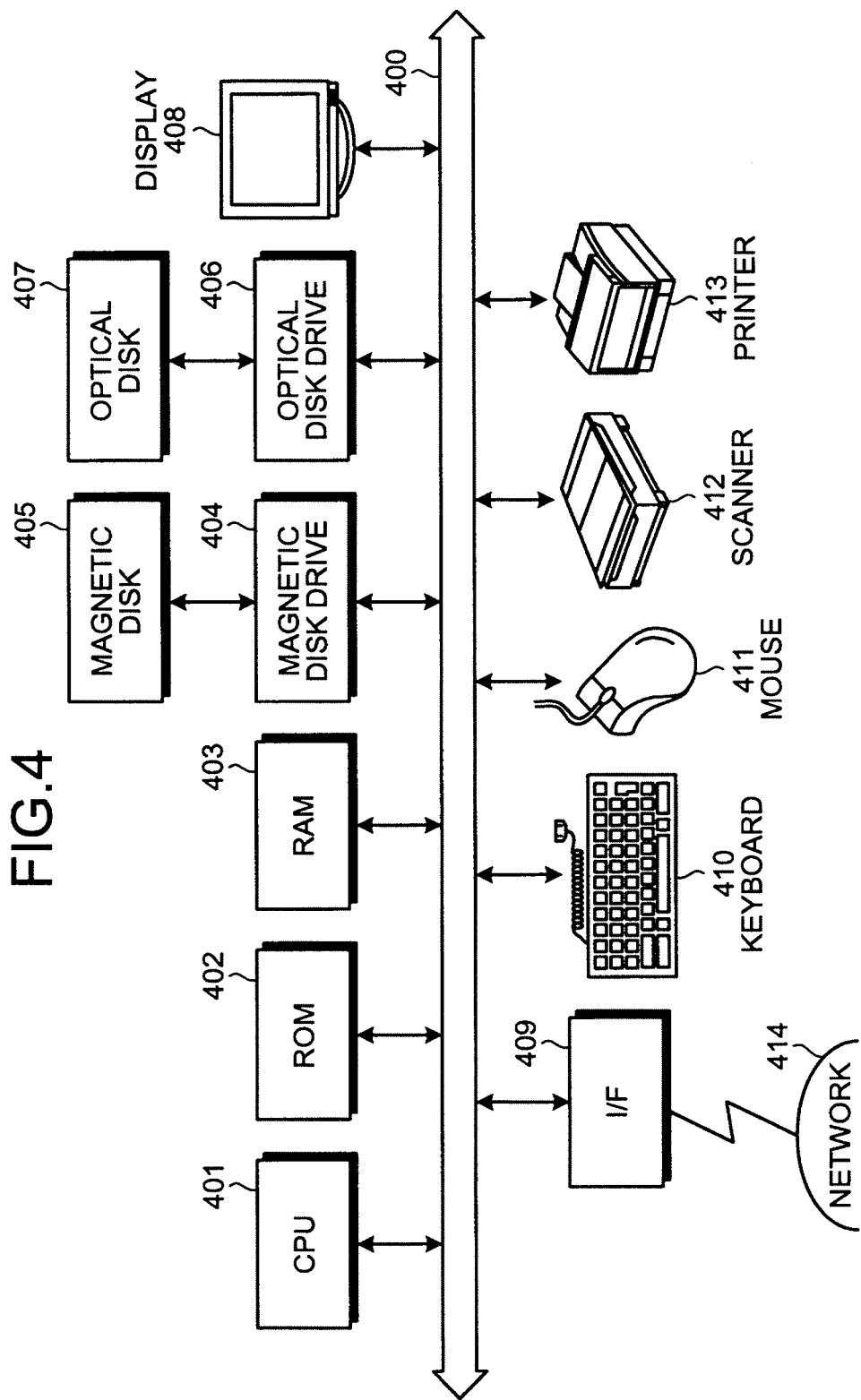

FIG.6

| DRIVER NAME FIELD | Dt FIELD | CP FIELD |
|---|---|---|
| VIDEO DRIVER | 16.6 [ms] | 10.2 [ms] |
| AUDIO DRIVER | 22 [μs] | 10.2 [μs] |
| CAMERA DRIVER | ... | ... |
| ... | ... | ... |
| HANDLER 1 | 35 [ms] | 10 [ms] |
| HANDLER 2 | 45 [ms] | 11 [ms] |
| HANDLER 3 | 35 [ms] | 10 [ms] |
| HANDLER 4 | 25 [ms] | 5 [ms] |
| HANDLER 5 | 20 [ms] | 5 [ms] |
| ... | ... | ... |

FIG.7

| PROCESS NAME FIELD | CP FIELD |
|---|---|
| PROCESS A | 1 [ms] |
| PROCESS B | 10 [μs] |
| PROCESS C | 100 [μs] |
| ... | ... |

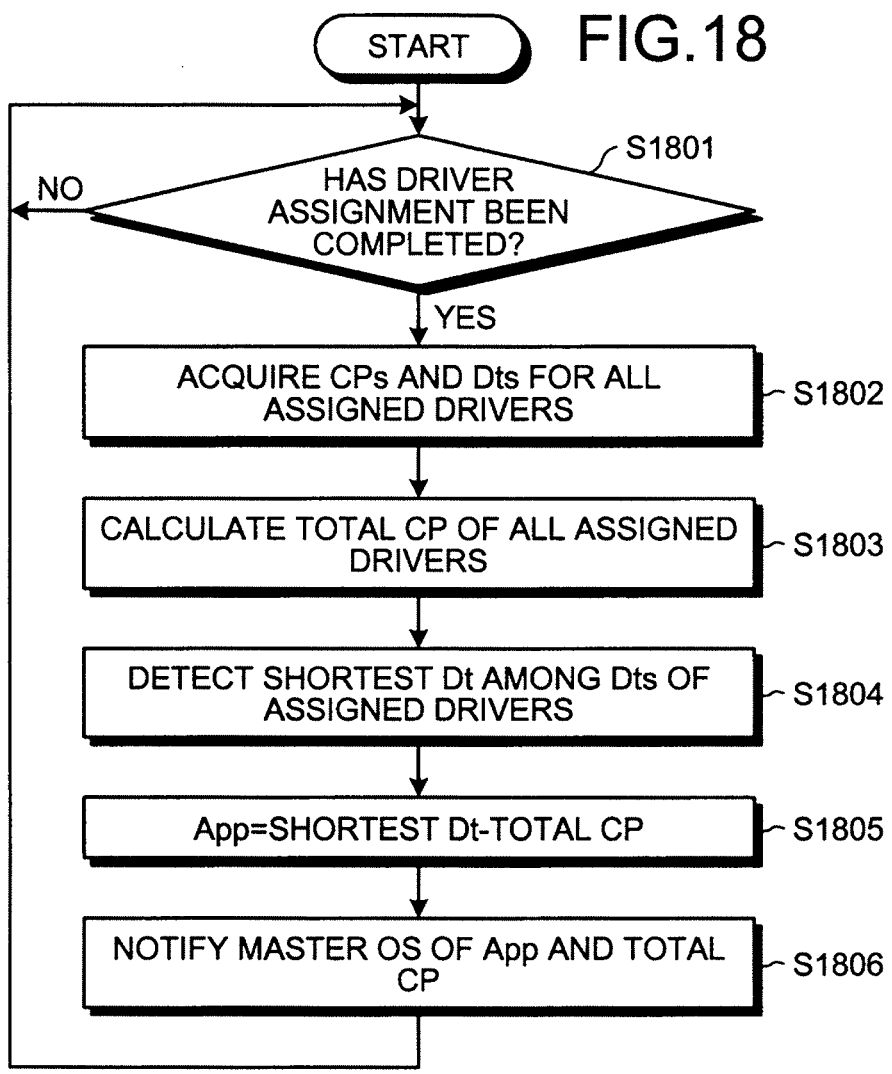

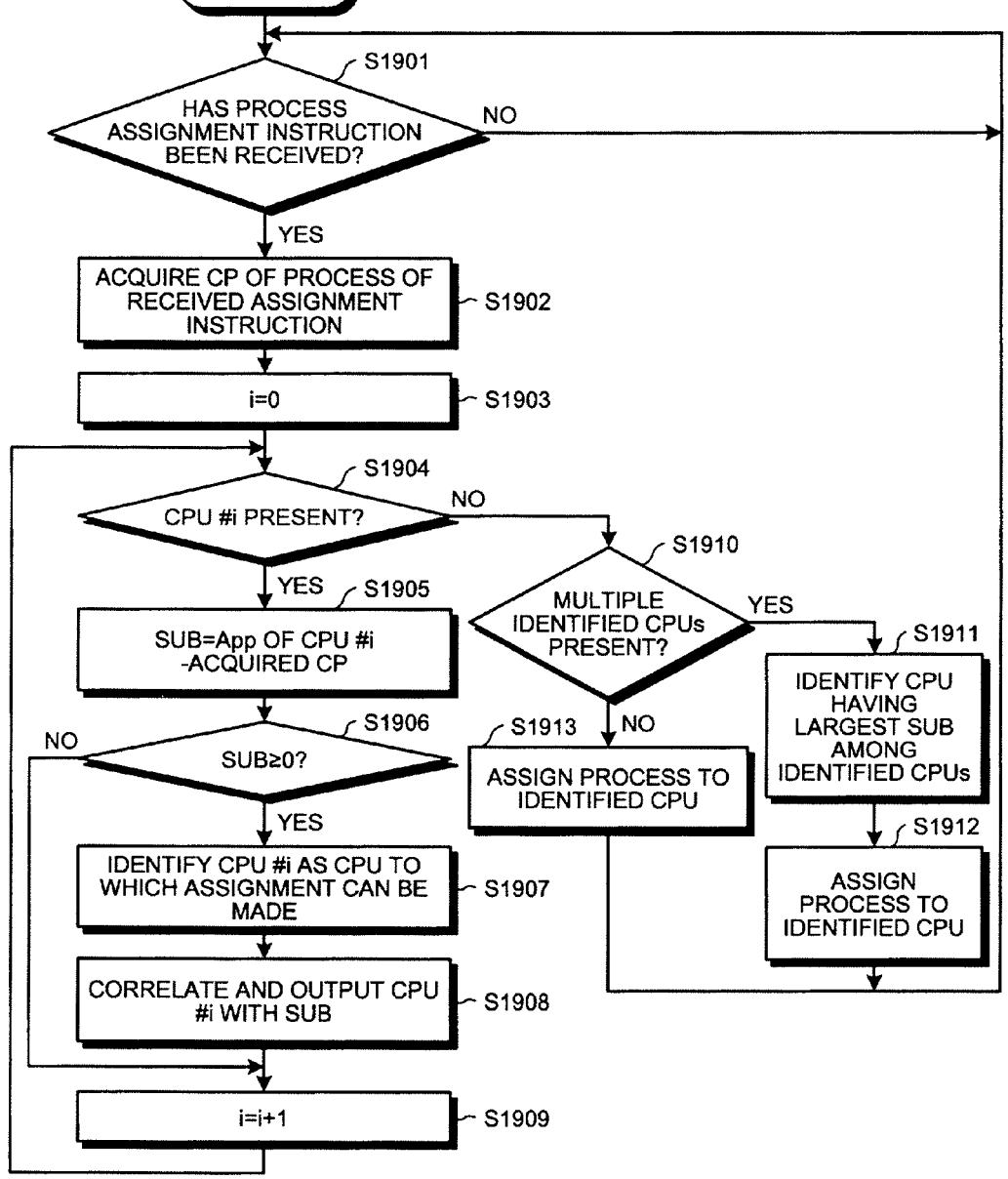

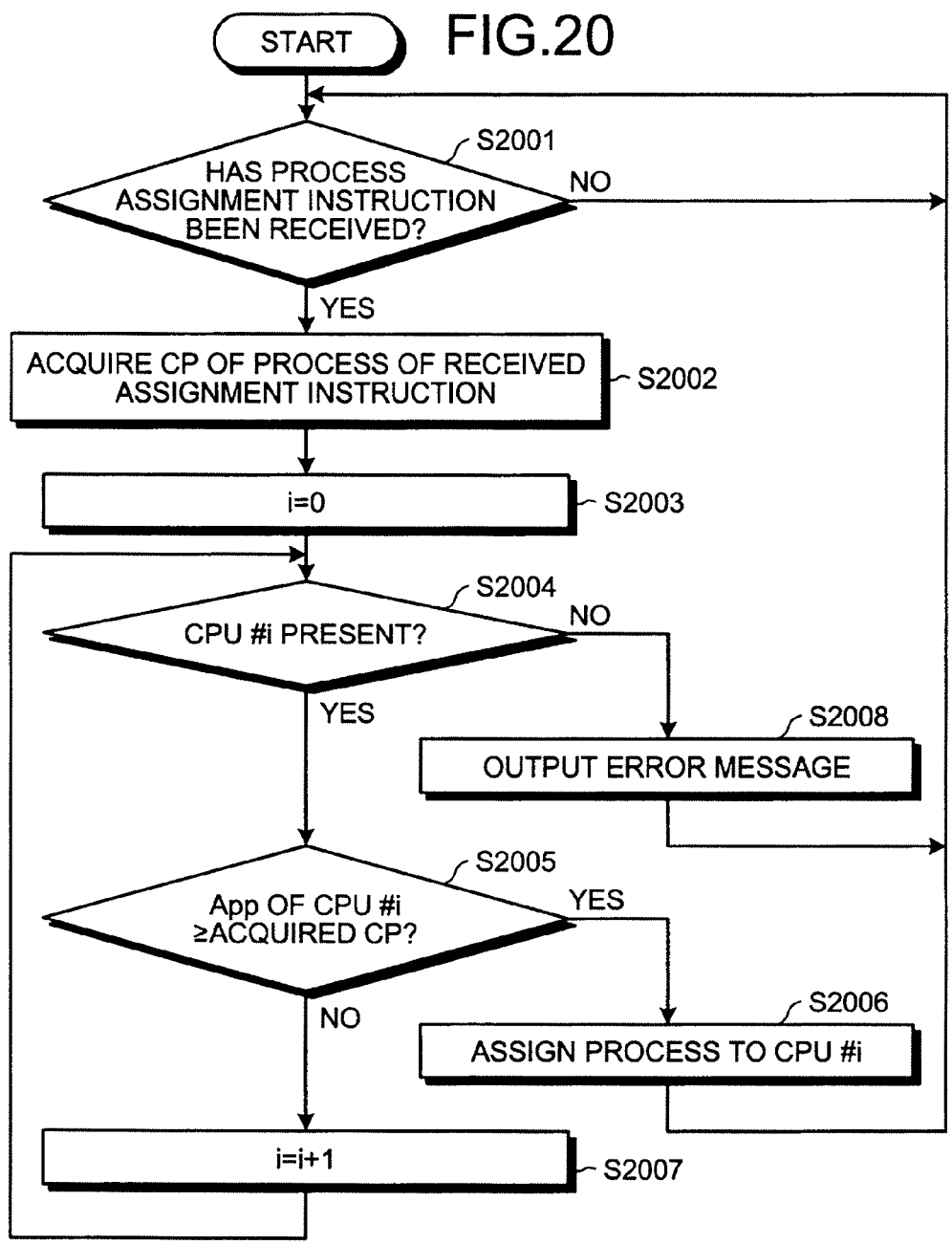

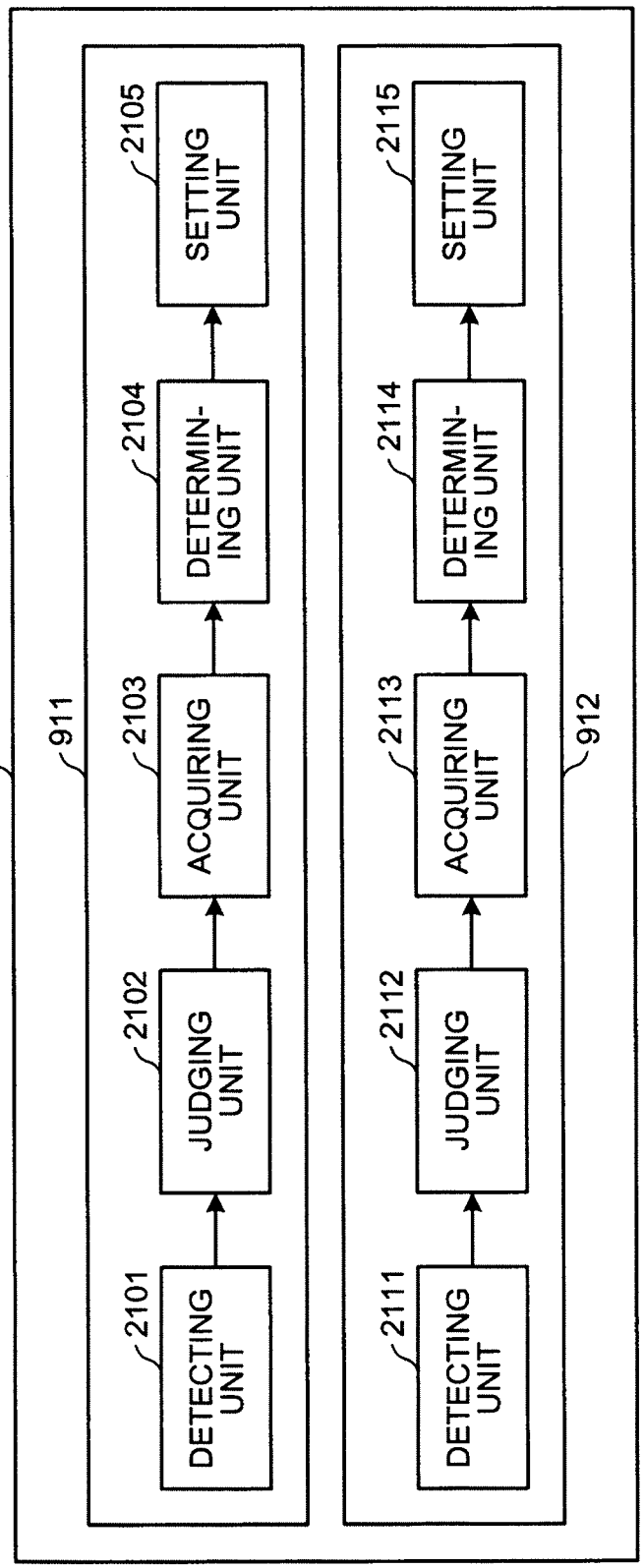

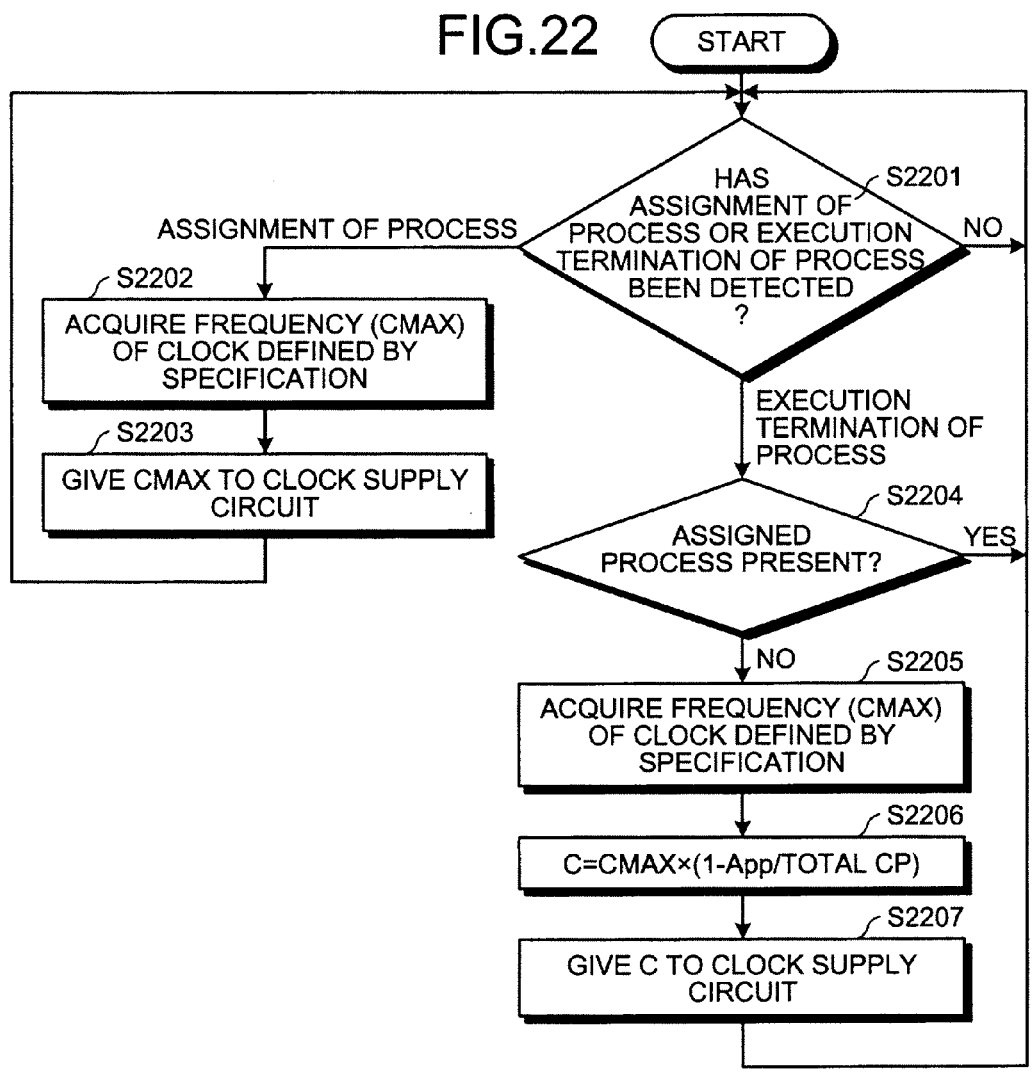

MULTICORE PROCESSOR SYSTEM, COMPUTER PRODUCT, ASSIGNING METHOD, AND CONTROL METHOD

CROSS REFERENCE TO RELATED APPLICATIONS

This application is a divisional application of U.S. patent application Ser. No. 13/752,138, filed Jan. 28, 2013, which is a continuation application of International Application No. PCT/JP2010/062908, filed Jul. 30, 2010, and designating the U.S., the entire contents each of which are incorporated herein by reference.

FIELD

The embodiments discussed herein are related a multicore processor system, an assigning program, and an assigning method that control process assignment or driver assignment. The embodiments relate to a multicore processor system, a control program, and a control method that control the frequency of a clock supplied to a processor.

BACKGROUND

A conventional technique executes, at high speed, processing corresponding to a device in a computer system by saving a process under execution by a central processing unit (CPU) in response to an interrupt signal from the device and executing the interrupt processing for the interrupt signal. The processing corresponding to a device refers to a device driver and the operations of the device driver include a single-operation type driver concluded with one interrupt signal and a continuous-operation type driver allowing the occurrence of one interrupt signal to cause continuous generation of interrupt signals at regular time intervals, etc.

The single-operation type driver makes a change to a software-friendly interface in response to a register setting operation of a device. The single-operation type driver corresponds to a driver of a keyboard and a driver of a mouse, for example. The continuous-operation type driver sets the direct memory access (DMA) to perform data transfer in response to an interrupt signal of depletion or a buffer-full state of a buffer managed by First-In, First-Out (FIFO). The continuous-operation type driver corresponds to a driver of a display and a driver of a camera, for example.

The continuous-operation type driver often has a deadline time according to a specification of object data subject to the data transfer. For example, if a display is refreshed at 60 [Hz], the driver of the display has a specification of transferring data within the deadline time of about 0.017 [seconds].

Taking a camera driver as an example, a camera device is mounted as an input device on a terminal and input data from the camera device is accumulated one line at a time in a line buffer simultaneous with shooting. When ½ of the capacity of the line buffer is reached, the line buffer causes the interrupt processing to transfer the data accumulated in the line buffer to shared memory by using direct memory access (DMA) for image processing or compression.

In a single core processing system, a technique is known that switches execution of multiple processes in one CPU based on the processing times of the processes (see. e.g., Japanese Laid-Open Patent Publication No. 2005-285093).

In a multicore processor system, assignment of each driver is determined at the time of activation of the system. For example, a technique is known that defines one CPU in a multicore processor as a CPU dedicated to drivers so that when interrupt processing is generated, the processing can be executed without saving a process (see. e.g., Japanese Laid-Open Patent Publication No. H4-33130).

However, a process may have processing defined to disable interrupt. If interrupt processing of a driver occurs during the execution of the processing defined to disable interrupt, the interrupt processing is not immediately executed. Since a continuous-operation type driver has a deadline time as described above, if the processing time of the processing defined to disable interrupt is longer than the deadline time, it is problematic that the continuous-operation type driver cannot meet the deadline time.

For example, if a deadline time of a function of transferring line buffer data to a shared memory cannot be met as in the camera driver described above, data that cannot be transferred is lost and data of a shot image is omitted, resulting in a rough image.

As described, when a CPU dedicated to drivers is disposed in a multicore processor system, an overlap with the processing defined to disable interrupt does not occur. However, if multiple processes are activated in a CPU dedicated to processes and no driver is executed in the CPU dedicated to drivers, a load is problematically concentrated only to the CPU dedicated to processes.

SUMMARY

According to an aspect of an embodiment, a multicore processor system comprising core configured to detect a process assignment instruction; acquire a remaining time obtained by subtracting a processing time of interrupt processing assigned to an arbitrary core of a multicore processor from a period that is from a calling time of the interrupt processing to an execution time limit of the interrupt processing, upon detecting the process assignment instruction; judge if the remaining time acquired at the acquiring is greater than or equal to a processing time of processing defined to limit an interrupt in the process; and assign the process to the arbitrary core, upon judging that the remaining time is greater than or equal to the processing time of the processing defined to limit an interrupt in the process.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a block diagram of a hardware configuration of a design support apparatus according to a first embodiment;

FIG. 6 is an explanatory view of an output example of CPs and Dts of drivers;

FIG. 7 is an explanatory view of an output example of CP of a process;

FIG. 18 is a flowchart of a calculation process procedure;

FIG. 19 is a flowchart of an assignment process procedure 1 by the master OS;

FIG. 20 is a flowchart of an assignment process procedure 2 by an OS 911;

FIG. 21 is a functional diagram of the multicore processor system 900 for a clock frequency; and FIG. 22 is a flowchart of a clock frequency control process procedure of an OS.

DESCRIPTION OF EMBODIMENTS

Preferred embodiments of the present invention will be explained with reference to the accompanying drawings.

Preferred embodiments of a multicore processor system, an assigning program, and an assigning method according to the present invention will now be described in detail with reference to the accompanying drawings.

Figure 1:
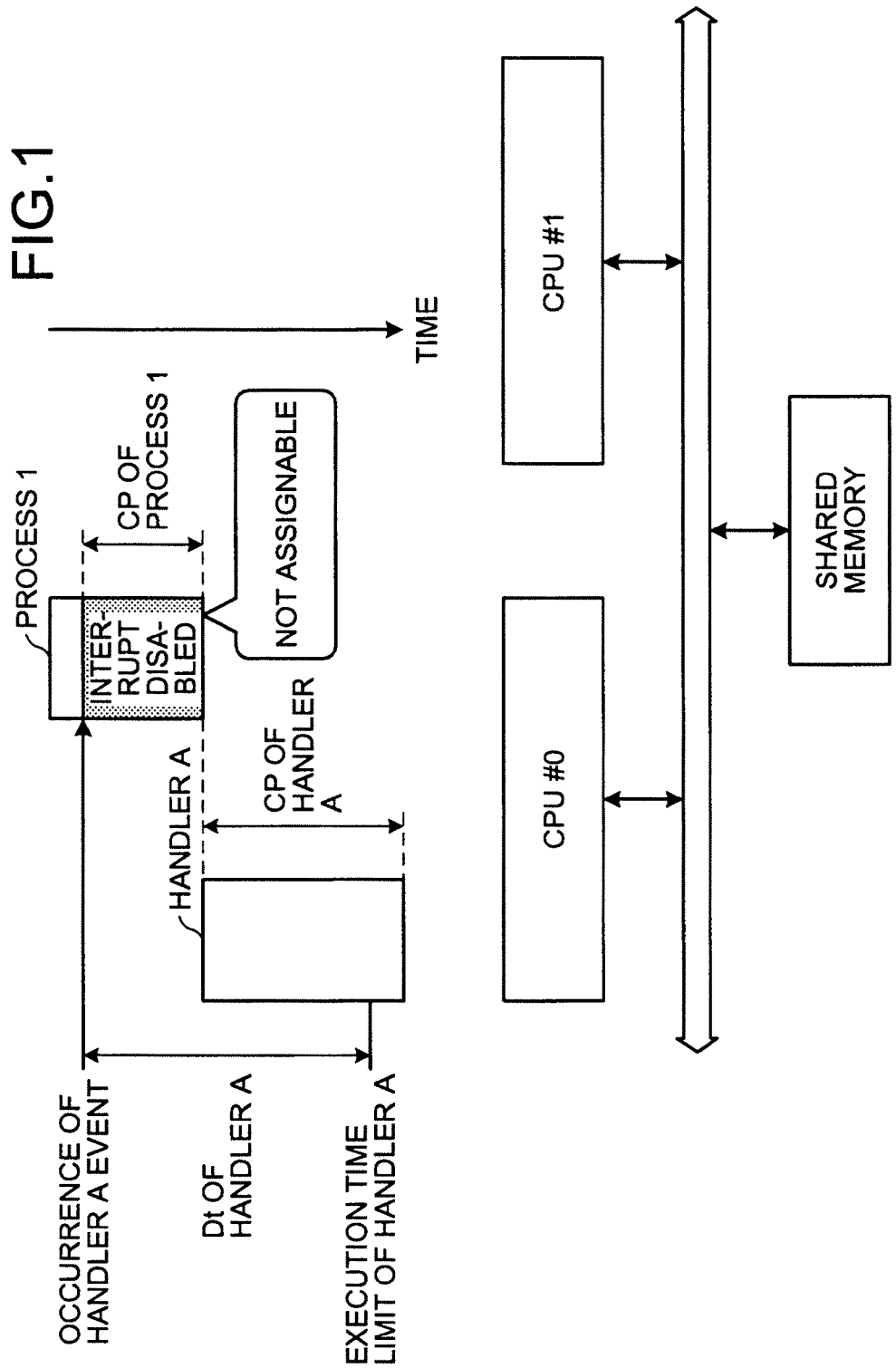
FIG. 1 is an explanatory view of an example of the present invention.

FIG. 1 is an explanatory view of an example of the present invention. First, a CPU #0 detects an assignment instruction for a process 1. The CPU #0 acquires the remaining time obtained by subtracting the processing time of a handler A that is interrupt processing assigned to the CPU #0, i.e., CP of the handler A, from a period (Dt of the handler A) that is from the time of occurrence of a handler A event to the execution time limit of the handler A.

The CPU #0 determines if the acquired remaining time is greater than or equal to a processing time of processing defined to disable interrupt in the process 1 (CP of the process 1). In other words, it is determined whether the Dt of the handler A can be met if the process 1 is assigned to the CPU #0, even if the handler A event occurs during the execution of the process 1.

As depicted in FIG. 1, it is determined that the Dt of the handler A may not be met if the process 1 is assigned to the CPU #0, when the handler A event occurs during the execution of the processing defined to disable interrupt in the process 1. Therefore, the CPU #0 does not assign the process 1 to the CPU #0.

Figure 2:
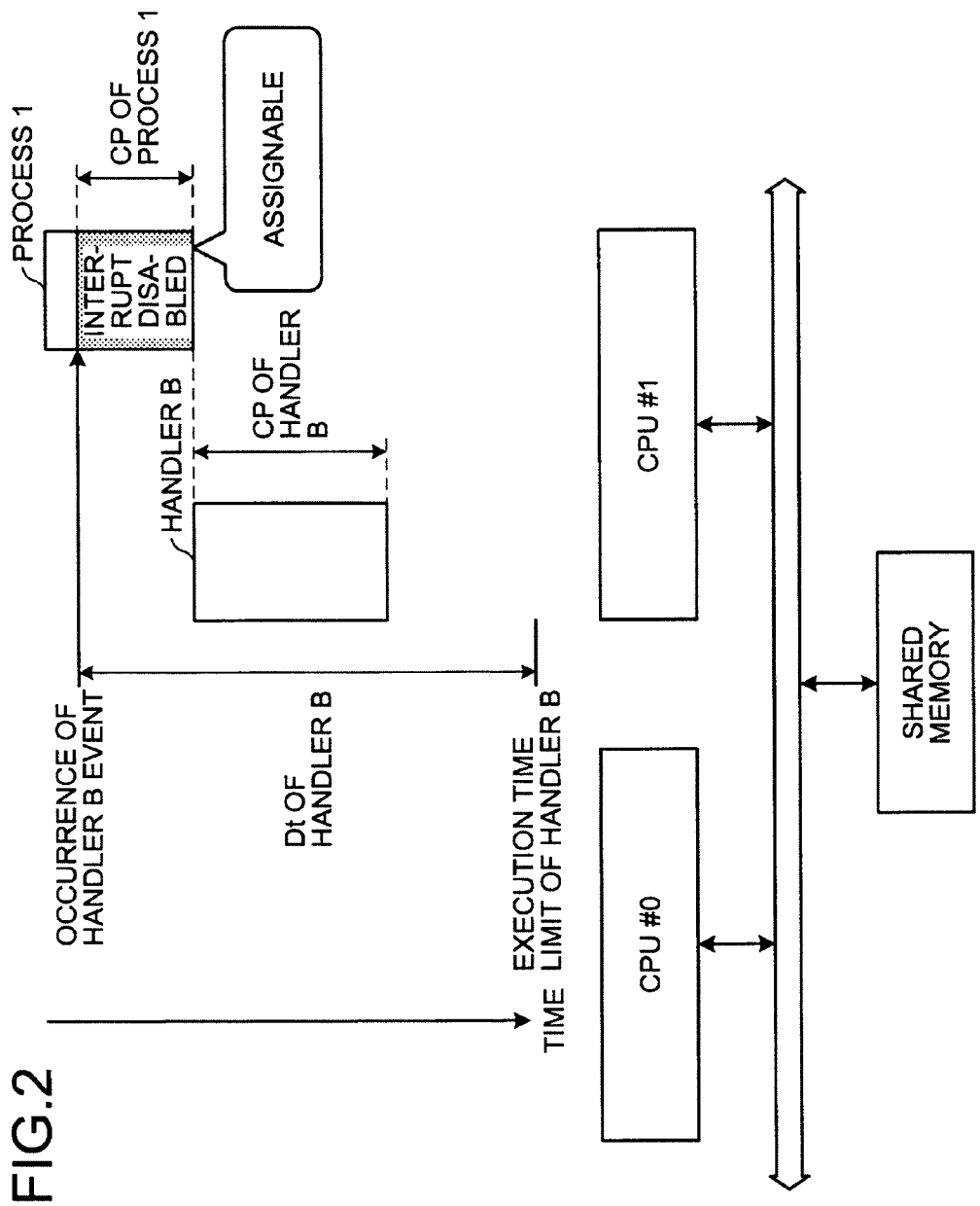
FIG. 2 is an explanatory view of another example of the present invention.

FIG. 2 is an explanatory view of another example of the present invention. First, the CPU #0 detects an assignment instruction of the process 1. The CPU #0 acquires the remaining time obtained by subtracting the processing time of a handler B that is interrupt processing assigned to the CPU #1, i.e., CP of the handler B, from a period (Dt of the handler B) that is from the time of occurrence of an event of the handler B to the execution time limit of the handler B.

The CPU #0 determines whether the acquired remaining time is greater than or equal to a processing time for processing defined to disable an interrupt in the process 1 (CP of the process 1). In other words, it is determined whether the Dt of the handler B can be met if the process 1 is assigned to the CPU #1, even if the event of the handler B occurs during the execution of the process 1.

As depicted in FIG. 2, it is determined that the Dt of the handler B can be met when the event of the handler B occurs during the execution of the process 1. Therefore, the CPU #0 assigns the process 1 to the CPU #1.

In a first embodiment, the calculation of an execution time for each driver and the deadline for each driver will be described. In a second embodiment, the time of activation of a multicore processor, the assignment of an interrupt handler, and the assignment of a process will be described.

In the first embodiment, the calculation of an execution time of each driver will be described using an electronic system level (ESL) model. The ESL model is a technique of simulating a hardware environment by the description based on behavior of a hardware device. For example, an ESL model of a CPU is represented by an issued command and the time required for the command instead of directly simulating an electric-circuit mechanism of command issuance.

In an ESL model of a bus, instead of exact calculation of the delay of data propagation due to a circuit mechanism, design latency patterns are multiplied by each other consequent to an access request to perform simulation that takes operation and time as behavior.

The simulation conventionally means that simulation is performed based on circuit design information such as that of the register transfer level (RTL) without actually implementing a semiconductor, and is used for verification performed by implementing operation equivalent to an actual device.

However, detailed simulation at a circuit level consumes a significant amount of time (normally, a processing time that is several ten million to several hundred million times longer as compared to the speed of the actual device) and to analyze overall behavior of a system while running an application is difficult in practice. On the other hand, since processing and time are analyzed as behavior, the ESL model provides an environment enabling the evaluation of a general processing time without performing circuit simulation.

Figure 3:
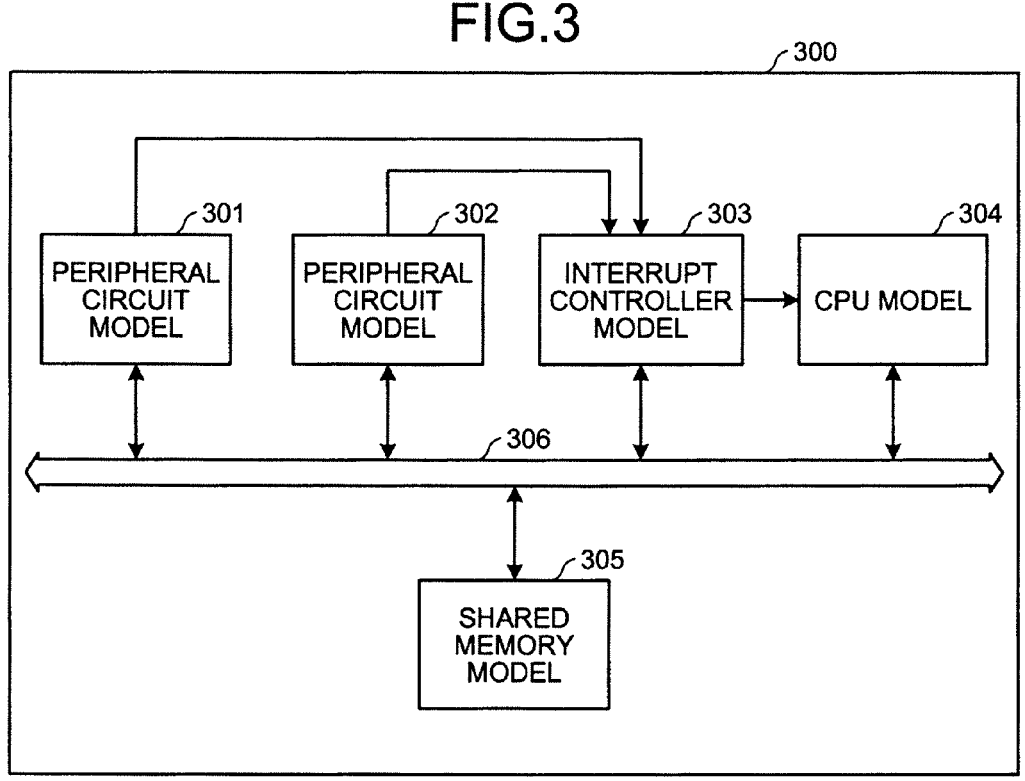
FIG. 3 is an explanatory view of an example of an ESL model.

FIG. 3 is an explanatory view of an example of an ESL model. An ESL model 300 has an evaluated peripheral circuit model 301, a peripheral circuit model 302, an interrupt controller model 303, and a CPU model 304.

The evaluated peripheral circuit model 301 is a camera device model or a moving image reproduction device model, for example. If the evaluated peripheral circuit model 301 is a camera device model, an evaluation given driver is a camera driver. The evaluated peripheral circuit model 301 and the peripheral circuit model 302 may be any models accessing to a shared memory model 305.

In this example, the load on the CPU model 304 is increased by increasing the number of bus buffers. For example, when the depth of the bus buffer is 2, if the bit width of the bus model 306 is 128 bits, this means that hardware other than CPU model 304 (the evaluated peripheral circuit model 301 and the peripheral circuit model 302) occupies 16 bits of the bus model 306. When the depth of the bus buffer is 16, if the bit width of the bus model 306 is 128 bits, this means that hardware other than CPU model 304 (the evaluated peripheral circuit model 301 and the peripheral circuit model 302) occupies 128 bits of the bus model 306.

FIG. 4 is a block diagram of a hardware configuration of a design support apparatus according to the first embodiment. As depicted in FIG. 4, the design support apparatus includes a central processing unit (CPU) 401, a read-only memory (ROM) 402, a random access memory (RAM) 403, a magnetic disk drive 404, a magnetic disk 405, an optical disk drive 406, an optical disk 407, a display 408, an interface (I/F) 409, a keyboard 410, a mouse 411, a scanner 412, and a printer 413, respectively connected by a bus 400.

The CPU 401 governs overall control of the design support apparatus. The ROM 402 stores therein programs such as a boot program. The RAM 403 is used as a work area of the CPU 401. The magnetic disk drive 404, under the control of the CPU 401, controls the reading and writing of data with respect to the magnetic disk 405. The magnetic disk 405 stores therein data written under control of the magnetic disk drive 404.

The optical disk drive 406, under the control of the CPU 401, controls the reading and writing of data with respect to the optical disk 407. The optical disk 407 stores therein data written under control of the optical disk drive 406, the data being read by a computer.

The display 408 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 408.

The I/F 409 is connected to a network 414 such as a local area network (LAN), a wide area network (WAN), and the Internet through a communication line and is connected to other apparatuses through the network 414. The I/F 409 administers an internal interface with the network 414 and controls the input/output of data from/to external apparatuses. For example, a modem or a LAN adaptor may be employed as the I/F 409.

The keyboard 410 includes, for example, keys for inputting letters, numerals, and various instructions and performs the input of data. Alternatively, a touch-panel-type input pad or numeric keypad, etc. may be adopted. The mouse 411 is used to move the cursor, select a region, or move and change the size of windows. A track ball or a joy stick may be adopted provided each respectively has a function similar to a pointing device.

The scanner 412 optically reads an image and takes in the image data into the design support apparatus. The scanner 412 may have an optical character reader (OCR) function as well. The printer 413 prints image data and text data. The printer 413 may be, for example, a laser printer or an ink jet printer.

The calculation of Dt for each given driver will be described. The CPU 401 acquires an operating frequency of the object peripheral circuit for each given driver and the CPU 401 defines a calculation result of 1/operating frequency as a deadline. For example, an operation specification of a display is 60 [Hz] and an operation specification of audio processing is 44.1 [kHz].

$Dt$ of a display driver=1/60=16.6 [ms]

$Dt$ of an audio driver=1/44.1=22 [µs]

CP of each given driver will be described.

Figure 5A:
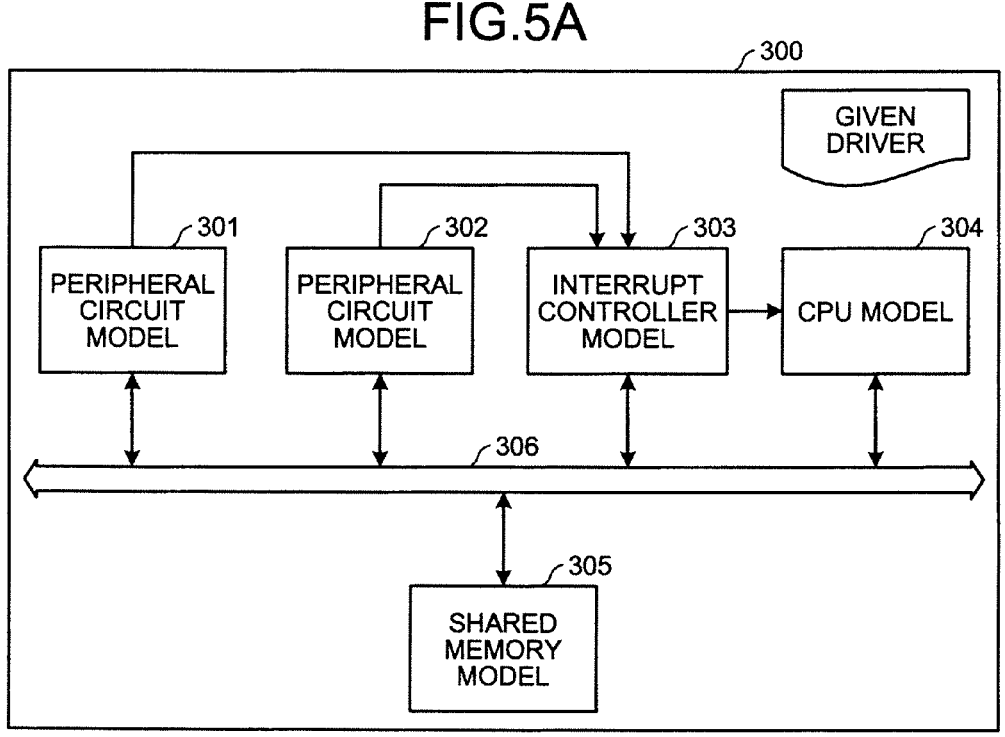
FIGS. 5A and 5B are explanatory views of an ESL simulation example.
Figure 5B:
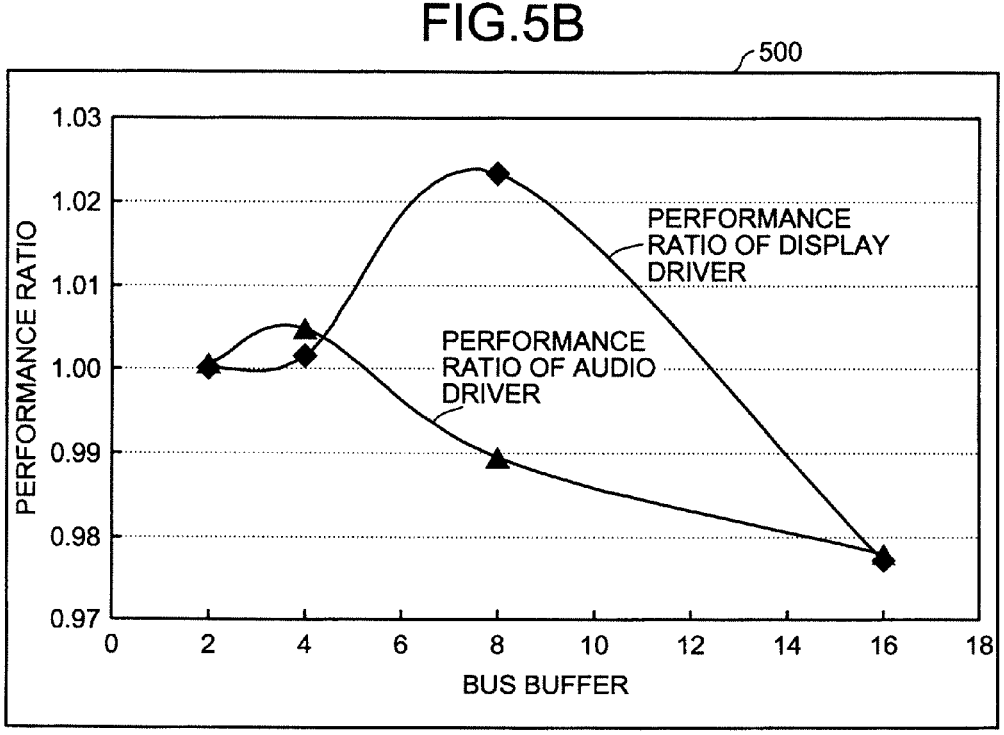

FIGS. 5A and 5B are explanatory views of an ESL simulation example. As depicted in FIG. 5A, the CPU 401 uses an ESL simulator to assign and execute an evaluation given driver onto the CPU model 304 of the ESL model 300. A theoretical execution value is defined as an execution time when the depth of the bus buffer is 2. It is assumed that the theoretical execution value of the display driver and the theoretical execution value of the audio driver are 10.0 [ms] and 10.0 [µs], respectively.

In a graph 500 in FIG. 5B, the simulation results represent a performance ratio of the display driver and a performance ratio of the audio driver. The horizontal axis of the graph 500 indicates bus buffer depth and the vertical axis of the graph 500 indicates a performance ratio. The performance ratio is a ratio of an execution time when the performance at the bus buffer depth of 2 is assumed to be 1.

For example, the CPU 401 detects the lowest performance ratio of each driver from the graph 500. In this example, both the display driver and the audio driver indicate the lowest performance ratio of 0.98 when the depth of the bus buffer is 16. Therefore, that the performance deteriorates by 2 [%]. In this example, the deterioration rates of the display driver and the audio driver are 2 [%]. An execution value (CP) from the ESL is calculated as follows.

$$CP = \text{theoretical execution value} \times \text{deterioration rate [\%]}$$

Therefore, the CP of the display driver is 10.0 [ms]×102 [%]=10.2 [ms]. The CP of the audio driver is 10.0 [µs]×102 [%]=10.2 [µs]. This enables the acquisition of an execution time of a driver when a CPU executing the driver competes with another CPU or hardware for access of the shared memory. Therefore, in the second embodiment, the process assignment and the driver assignment can be determined based on the execution time in the case of low performance.

For a process defined to disable an interrupt, the CPU 401 calculates an execution time (CP) of a processing defined to disable interrupt in the process. For example, the CPU 401 assigns the process to the CPU model 304 in the ESL model 300 and executes ESL simulation by using the ESL simulator to calculate the execution time (CP).

The CPU 401 outputs the CPs and Dts of the drivers and the CP of the process. The output format may be, for example, display on the display 408, print output to the printer 413, and transmission to an external apparatus through the I/F 4109. The output format may be storage in a storage area such as the RAM 403, the magnetic disk 405, and the optical disk 407.

FIG. 6 is an explanatory view of an output example of CPs and Dts of drivers. A table 600 retains Dt and CP for each interrupt driver. The table 600 has a driver name field 601, a Dt field 602, and a CP field 603. Identification information of a driver is retained in the driver name field 601; Dt is retained in the Dt field 602; and CP is retained in the CP field 603. For example, if the identification information in the driver name field 601 is a video driver, a value of the Dt field 602 is 16.6 [ms] and a value of the CP field 603 is 10.2 [ms]. Handlers 1 to 5 are used for description of the driver assignment.

FIG. 7 is an explanatory view of an output example of CP of a process. For each process defined to disable interrupt, a table 700 retains an execution time of a processing defined to disable interrupt in the process. The table 700 has a process name field 701 and a CP field 702. Identification information of a process is retained in the process name field 701 and an execution time of processing defined to disable interrupt is retained in the CP field 702.

Figure 8:
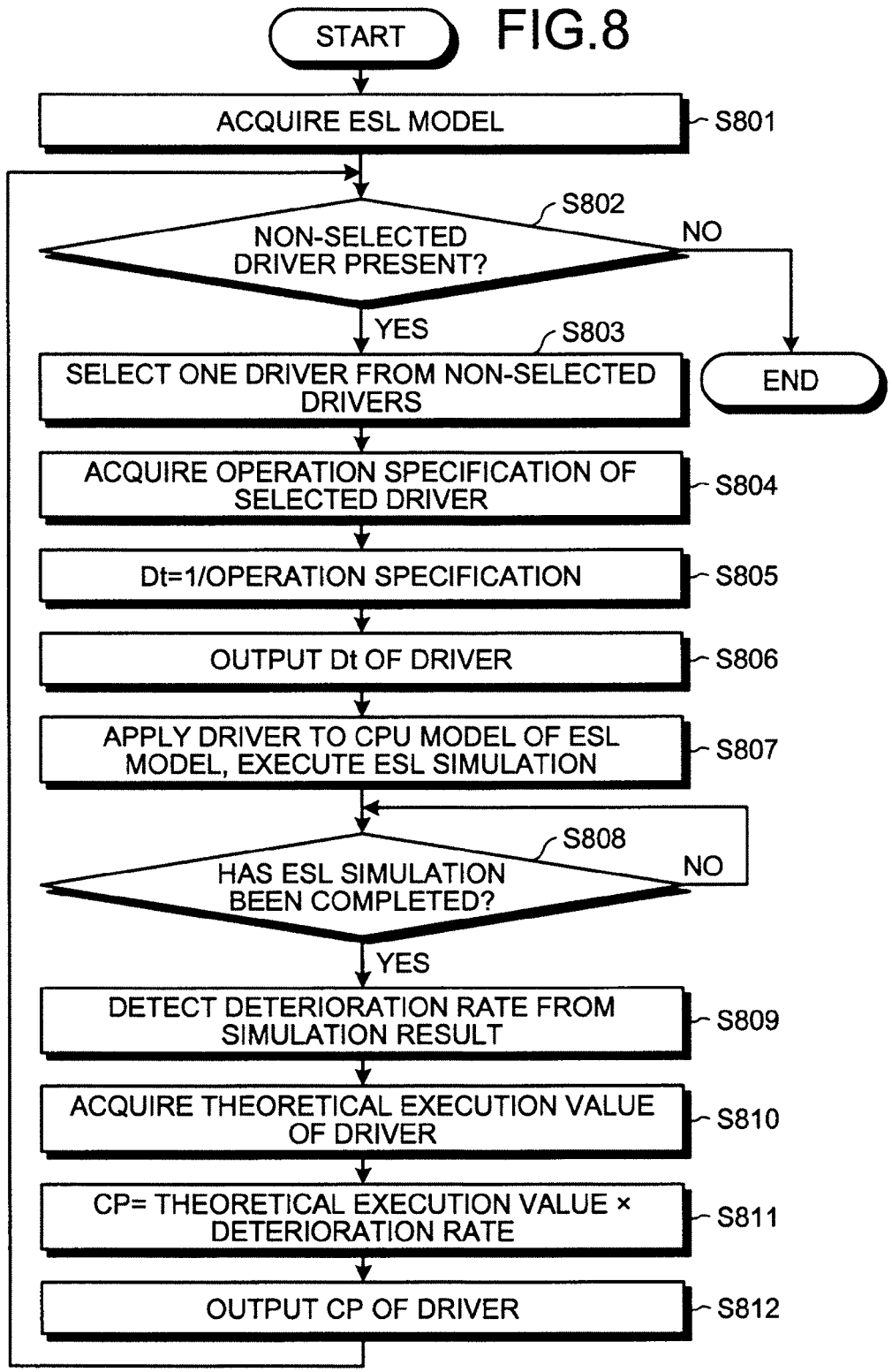
FIG. 8 is a flowchart of a calculation process procedure of CPs and Dts of drivers by the design support apparatus.

FIG. 8 is a flowchart of a calculation process procedure of CPs and Dts of drivers by the design support apparatus.

First, the design support apparatus acquires an ESL model (step S801) and determines whether a non-selected driver is present (step S802). If determining that a non-selected driver does is present (step S802: YES), the design support apparatus selects one driver from non-selected drivers (step S803).

The design support apparatus acquires an operation specification of the selected driver (step S804) and sets Dt=1/operation specification (step S805). The design support apparatus outputs Dt of the driver (step S806) and applies the driver to the CPU model of the ESL model to execute ESL simulation by using the ESL simulator (step S807). The design support apparatus determines whether the ESL simulation has been completed (step S808).

If determining that the ESL simulation has not been completed (step S808: NO), the design support apparatus returns to step S808. On the other hand, if determining that the ESL simulation has been completed (step S808: YES), the design support apparatus detects a deterioration rate from a simulation result (step S809).

The design support apparatus acquires a theoretical execution value of the driver (step S810) and calculates CP=theoretical execution value×deterioration rate (step S811). The theoretical execution value of the given driver may be calculated by a designer, based on the number of steps of an object program, for example. The calculated theoretical execution value of the driver is stored to a storage device accessed by the CPU 401. The design support apparatus outputs CP of the driver (step S812) and returns to step S802. If the design support apparatus determines that a non-selected driver is not present at step S802 (step S802: NO), the series of processes is terminated.

In the second embodiment, driver assignment and application assignment will be described. In a multicore processor system, a multicore processor is a processor equipped with multiple cores. As long as multiple cores are provided, the multicore processor may be a single processor equipped with multiple cores or a processor group of single-core processors arranged in parallel. In this embodiment, a processor group of single-core processors arranged in parallel is taken as an example for simplicity of description.

Figure 9:
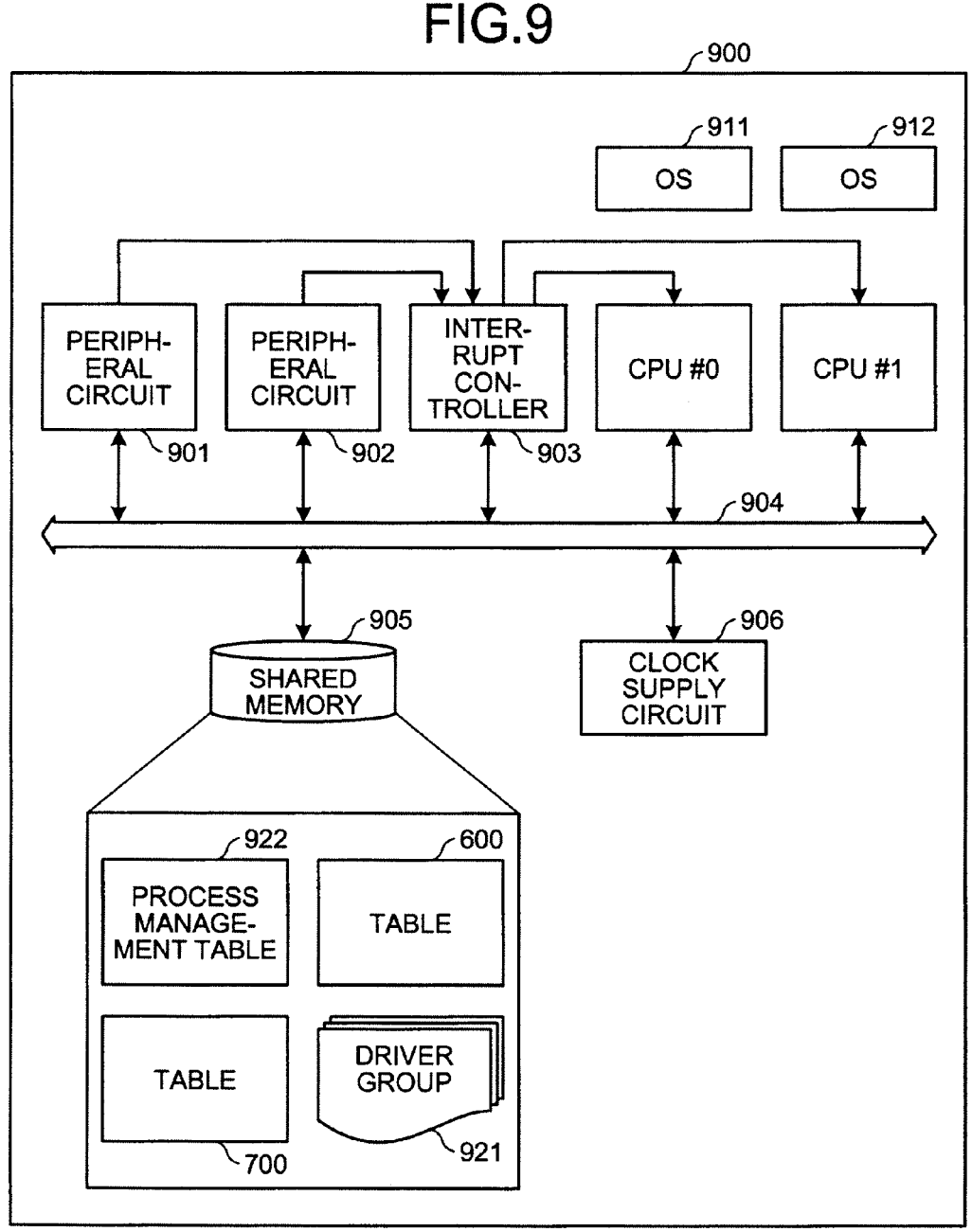
FIG. 9 is a block diagram of hardware of a multicore processor system.

FIG. 9 is a block diagram of hardware of a multicore processor system. A multicore processor system 900 has a peripheral circuit 901, a peripheral circuit 902, an interrupt controller 903, a CPU #0, a CPU #1, shared memory 905, and a clock supply circuit 906, respectively connected via a bus 904.

Each of the CPU #0 and the CPU #1 has a core, a register, and a cache. The CPU #0 executes an OS 911, which is a master OS, and is responsible for the overall control of the multicore processor system 900. The OS 911 has an assigning program that control to which CPU, a process for which an assignment instruction is given is assigned and controls the switching of processes in the CPU #0, and a control program that determines the frequency of a clock applied to the CPU #0. The OS 911 also has an assigning program that determines the driver assignment at the time of activation of the multicore processor system 900.

The CPU #1 executes an OS 912, which is a slave OS. The OS 912 has an assigning program that controls the switching of processes assigned to the CPU #1 and a control program that determines the frequency of a clock applied to the CPU #1.

The clock supply circuit 906 supplies respective clocks to the CPUs, the peripheral circuit 901, the peripheral circuit 902, the interrupt controller 903, and the shared memory 905. In the second embodiment, the clock supply circuit 906 has a register in which the CPUs can respectively set frequencies of clocks supplied to the units, for example. The clock supply circuit 906 generates clocks based on the values set in the register and supplies the clocks to the units.

The peripheral circuit 901 and the peripheral circuit 902 are, for example, a camera device, an audio device, and a keyboard.

The interrupt controller 903 receives an interrupt signal from the peripheral circuit 901 and the peripheral circuit 902, and causes each of the CPUs to call an interrupt handler corresponding to the interrupt signal, based on an interrupt table.

The shared memory 905 is memory shared by the CPU #0 and the CPU #1. The shared memory 905 has a read only memory (ROM), a random access memory (RAM), and a flash ROM, for example. The shared memory 905 stores a process management table 922, programs such as boot programs of the OSs 911 and 912, the tables 600 and 700 described above, a driver group 921, and the interrupt table not depicted.

For example, the ROM or the flash ROM stores the programs, the driver group, etc., and the RAM is used as a work area of the CPU #0 and the CPU #1. The OSs 911 and 912 stored in the shared memory 905 are loaded onto the CPUs, causing the CPUs to execute coded processing.

The driver group 921 has drivers corresponding to the peripheral circuits. Each of the OSs selects a driver to be called from the driver group 921.

The process management table 922 is information that indicates to which CPU, each process is assigned and whether a CPU assigned with a process is executing the process, for example. Each of the CPUs reads and stores the process management table 922 into the cache of the CPU. The OS 911 assigns a process to any one among the CPU #0 and the CPU #1 and registers into the process management table 922, the CPU to which the process is assigned. When each OS completes the execution of the process assigned to the OS, the OS deletes the description related to the process from the process management table 922.

In the second embodiment, the driver assignment will be described. In the second embodiment, the driver assignment is performed at the time of activation of the multicore processor system 900. This is not a limitation and the driver assignment may be determined after an OS of the multicore processor is updated or may be determined when a driver is downloaded.

(Functional Diagram of Multicore Processor System 900 Related to Time of Activation)

Figure 10:
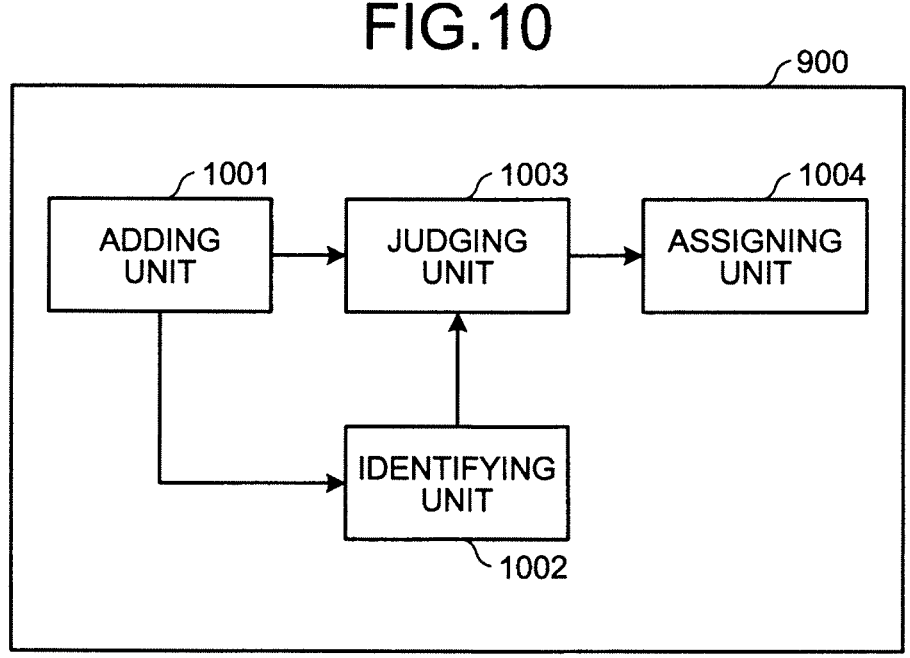
FIG. 10 is a functional diagram of a multicore processor system 900 related to the time of activation.

FIG. 10 is a functional diagram of the multicore processor system 900 related to the time of activation. The multicore processor system 900 has an adding unit 1001, an identifying unit 1002, a judging unit 1003, and an assigning unit 1004. The adding unit 1001 to the assigning unit 1004 are included in the OS 911 and the CPU #0 loads the OS 911 from the shared memory 905 and executes the processing coded in the OS 911.

The adding unit 1001 adds an execution time of given interrupt processing and execution times of assigned interrupt processing assigned to an arbitrary CPU in the multicore processor.

The judging unit 1003 judges whether an arbitrary CPU can meet an execution time limit from the time of calling of the given interrupt processing and execution time limits from the times of calling of the assigned interrupt processing, based on the sum obtained by the adding unit 1001.

The assigning unit 1004 assigns the given interrupt processing to the arbitrary CPU if the judging unit 1003 judges that the arbitrary CPU can meet the execution time limit from the time of calling of the given interrupt processing and the execution time limits from the times of calling of the assigned interrupt processing.

The identifying unit 1002 identifies the shortest period among a period of the given interrupt processing from the time of calling to the execution time limit and periods of the assigned interrupt processing from the calling times to the execution time limits of the assigned interrupt processing. In the second embodiment, the shortest period is referred to as a shortest Dt.

The judging unit 1003 judges whether the shortest period identified by the identifying unit 1002 is less than or equal to the sum from the adding unit 1001.

The assigning unit 1004 assigns the given interrupt processing to the arbitrary CPU if the judging unit 1003 judges that the shortest period is less than or equal to the sum.

In light of the above, detailed description will be made with reference to the figures.

Figure 11:
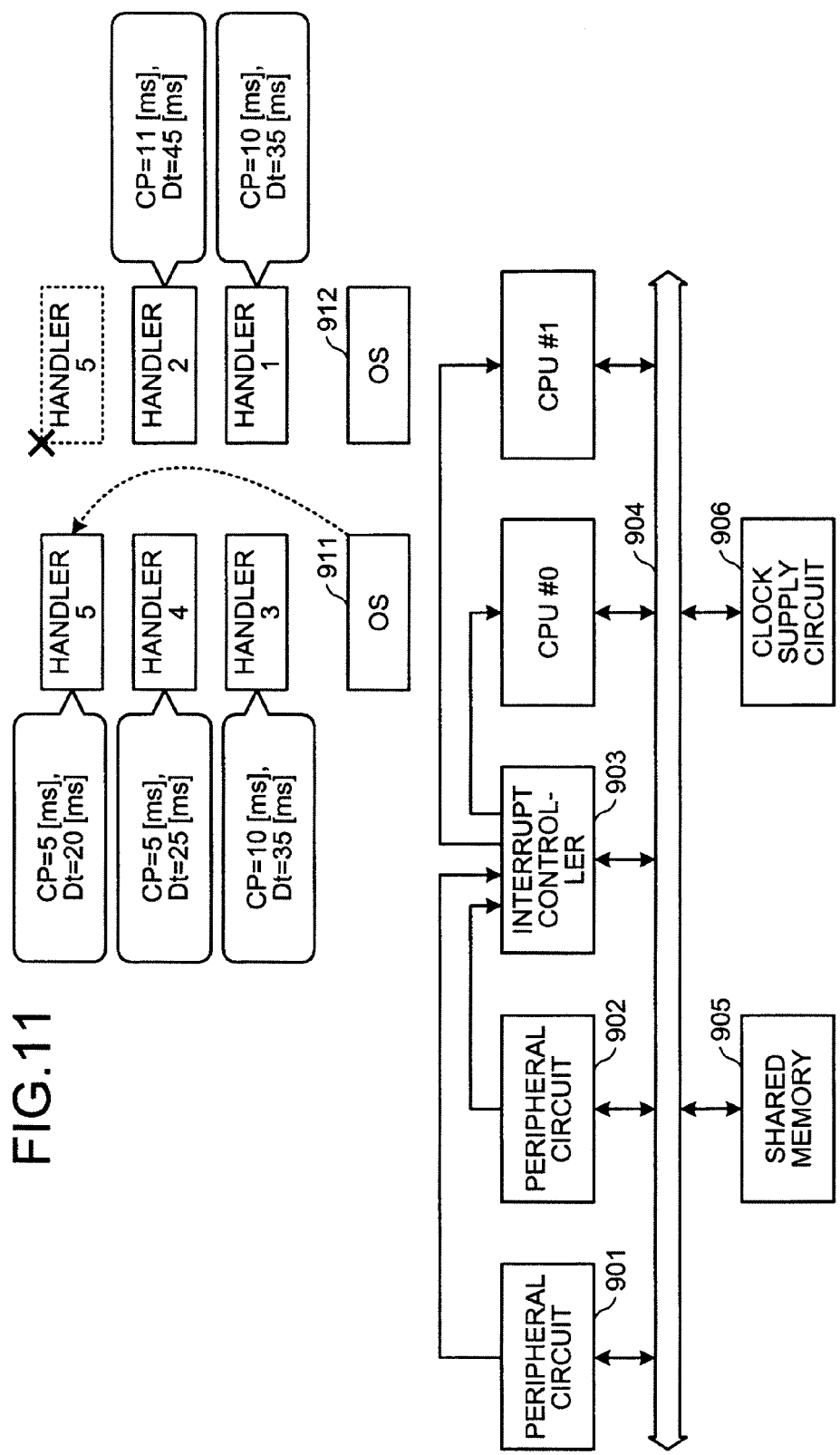
FIG. 11 is an explanatory view of an example of handler assignment.

FIG. 11 is an explanatory view of an example of handler assignment. A handler 3 and a handler 4 are assigned to the CPU #0 and a handler 1 and a handler 2 are assigned to the CPU #1. When the handlers are assigned, the OS 911 retrieves the CPs of all the assigned handlers from the table 600 to acquire the CPs of all the handlers. The OS 911 adds the acquired CPs to calculate a total CP value. The total CP value in the CPU #0 is 15 [ms] and the total CP value in the CPU #1 is 21 [ms].

First, the OS 911 selects an unassigned handler 5 from multiple handlers. Handlers are continuous-operation type handlers for which CPs and Dts are determined. The OS 911 acquires the handler 5 from the shared memory 905. The OS 911 retrieves the CP of the handler 5 and the Dt of the handler 5 from the table 600 and thereby, acquires the CP of the handler 5 and the Dt of the handler 5.

The OS 911 adds for each of the CPUs, the total CP value and the CP of the handler 5. The sum of the CPU #0 is 20 [ms] and the sum of the CPU #1 is 26 [ms]. The OS 911 identifies a CPU having a sum that is less than or equal to the Dt of the handler 5. In this example, the CPU #0 is identified. The OS 911 assigns the handler 5 to the identified CPU #0.

(Driver Assignment Process Procedure)

Figure 12:
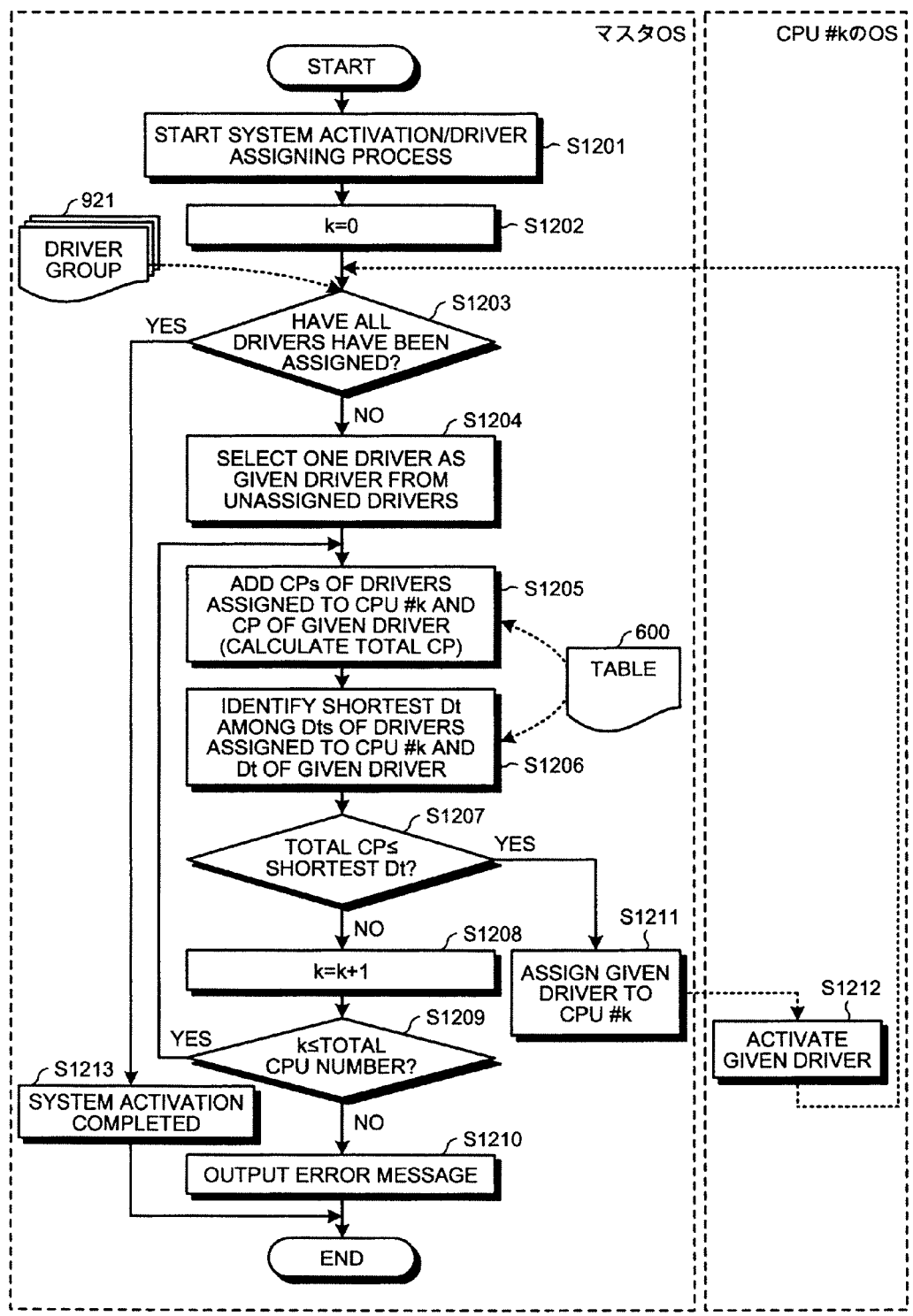
FIG. 12 is a flowchart of a driver assignment process procedure at the time of activation of the multicore processor system 900.

FIG. 12 is a flowchart of a driver assignment process procedure at the time of activation of the multicore processor system 900. Although the total CP values and the shortest Dts among all the CPUs are detected at the same time in the example above, the total CP value and the shortest Dt are detected sequentially from the CPU #0 to determine whether assignment to the CPU is possible.

First, the OS 911 starts a system activation/driver assigning process (step S1201). The OS 911 sets k=0 (step S1202) and determines whether all the drivers have been assigned (step S1203). If determining that not all the drivers have been assigned (step S1203: NO), the OS 911 selects one driver as a given driver from unassigned drivers (step S1204).

The OS 911 adds the CPs of the drivers assigned to a CPU #k and the CP of the given driver (calculates the total CP value) (step S1205). The OS 911 identifies the shortest Dt among the Dts of the drivers assigned to the CPU #k and the Dt of the given driver (step S1206). The OS 911 determines whether the total CP value≤the shortest Dt is satisfied (step S1207).

If determining that the total CP value≤the shortest Dt is not satisfied (step S1207: NO), the OS 911 sets k=k+1 (step S1208) and determines whether k≤the total CPU number (step S1209). If determining that k≤the total CPU number is satisfied (step S1209: YES), the OS 911 returns to step S1205. On the other hand, if determining that k≤the total CPU number is not satisfied (step S1209: NO), the OS 911 outputs an error message (step S1210) and terminates the series of processes. If determining that the total CP value≤the shortest Dt is satisfied (step S1207: YES), the OS 911 assigns the given driver to the CPU #k (step S1211). At the time of assignment, the CPU to which the given driver is assigned, is stored to the interrupt table. The OS 912 of the CPU #k activates the given driver (step S1212).

If the OS 911 determines that all the drivers have been assigned (step S1203: YES), the system activation is completed (step S1213) and the series of processes is terminated.

A designer of the multicore processor system 900 confirms that all the drivers are operable even if all the drivers have been assigned to the multicore processor at the time of design. As a result, the designer can verify that the multicore processor system 900 has no design failure.

Process assignment during operation of the multicore processor system 900 will be described.

Figure 13:
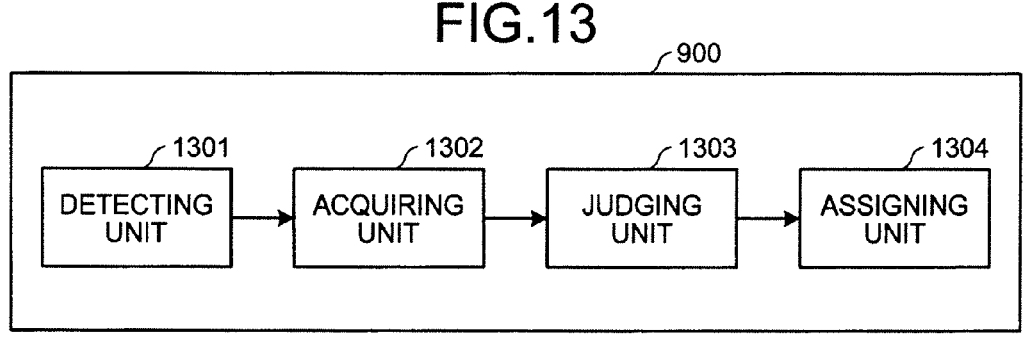
FIG. 13 is a functional diagram of the multicore processor system 900 during operation.

FIG. 13 is a functional diagram of the multicore processor system 900 during operation. The multicore processor system 900 has a detecting unit 1301, an acquiring unit 1302, a judging unit 1303, and an assigning unit 1304. The detecting unit 1301 to the assigning unit 1304 are included in the OS 911 and the CPU #0 loads the OS 911 from the shared memory 905 and executes the processing coded in the OS 911.

The detecting unit 1301 detects an assignment instruction of a process.

When the detecting unit 1301 detects an assignment instruction of a process, the acquiring unit 1302 acquires the remaining time obtained by subtracting the processing time of interrupt processing assigned to an arbitrary CPU of the multicore processor from a period that is from the calling time of the interrupt processing to the execution time limit of the interrupt processing. The period from the calling time of the interrupt processing to the execution time limit of the interrupt processing is Dt. The remaining time is denoted by App.

The judging unit 1303 judges if the remaining time acquired by the acquiring unit 1302 is greater than or equal to a processing time of the processing defined to disable interrupt in the process.

The assigning unit 1304 assigns the process to the arbitrary CPU if the judging unit 1303 judges that the remaining time is greater than or equal to the processing time of the processing defined to disable an interrupt in the process.

In light of the above, description will be made with reference to the figures.

Figure 14:
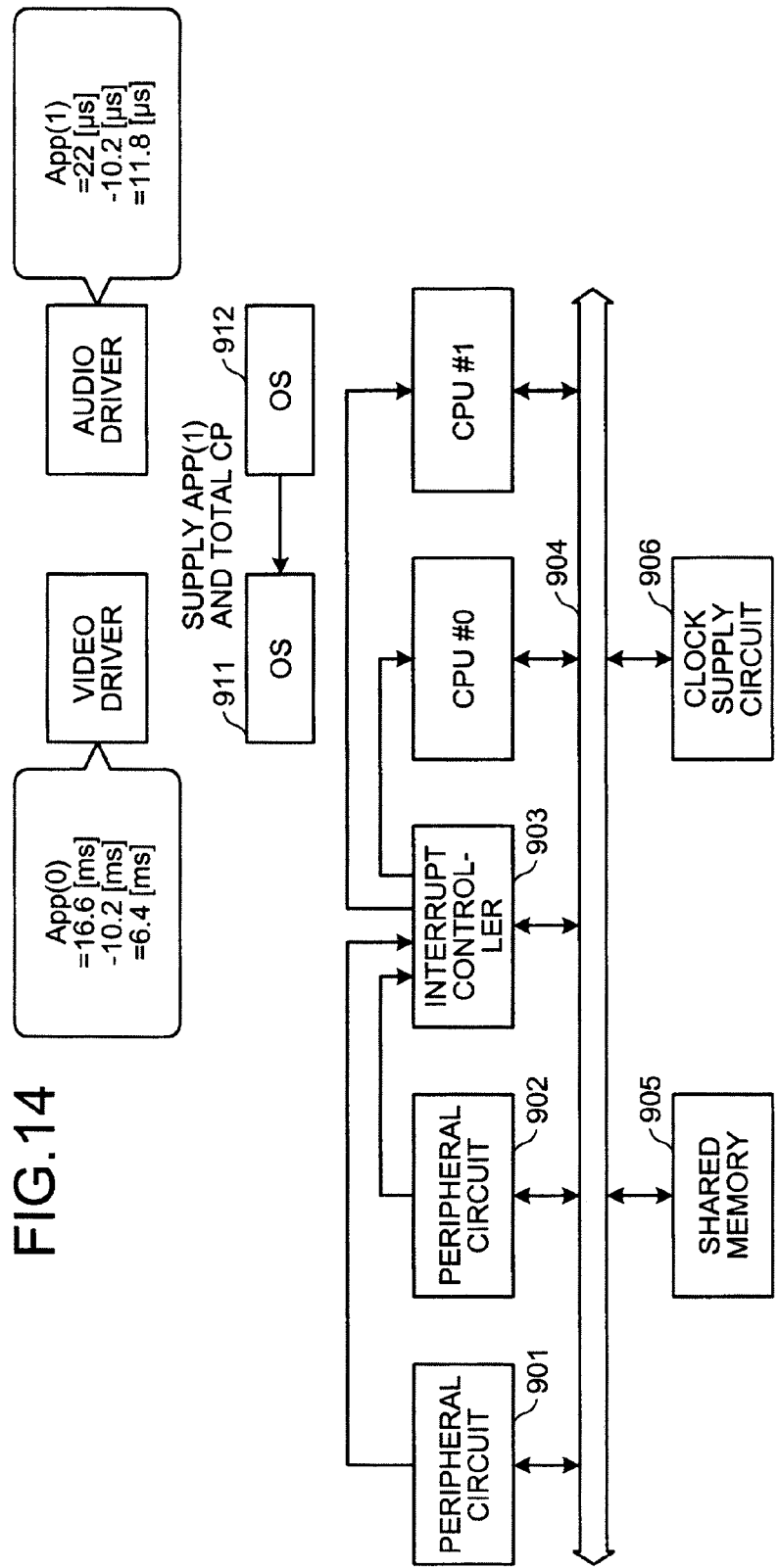
FIG. 14 is an explanatory view of a calculation example of App.

FIG. 14 is an explanatory view of a calculation example of App. In FIG. 14, a video driver is assigned to the CPU #0 and an audio driver is assigned to the CPU #1. After the driver assigning processing is completed, each OS searches the table 600 to acquire the CPs of all the assigned drivers and the Dts of the drivers.

Each OS calculates the total CP value. Since only one driver is assigned to each of the OSs in FIG. 14, the total CP value in the OS 911 is 10.2 [ms] and the total CP value in the OS 912 is 10.2 [μs]. Each OS detects the shortest Dt, i.e., the shortest among the Dts of the assigned drivers. The shortest Dt in the OS 911 is 16.6 [ms] and the shortest Dt in the OS 912 is 22 [μs].

Each OS subtracts the total CP value from the shortest Dt. The resulting difference in the OS 911 and the difference in the OS 912 are denoted by App(0) and App(1), respectively.

The OS 912 correlates and notifies the OS 911, i.e., the master OS, of App(1) and the total CP value. Each OS outputs the total CP value and App. The output format may be storage to the shared memory 905, for example.

Figure 15:
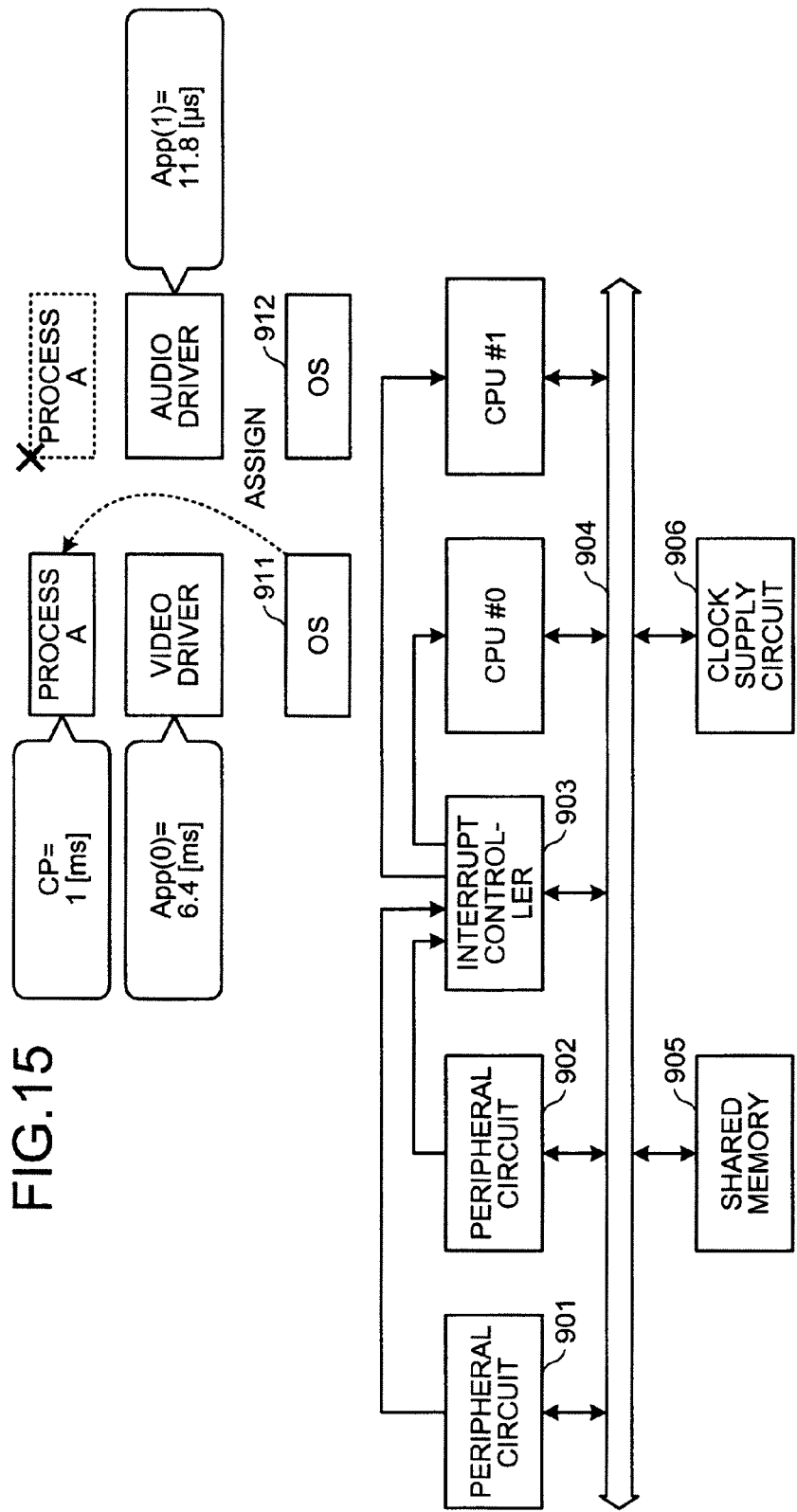
FIG. 15 is an explanatory view of an assignment example of a process A.

FIG. 15 is an explanatory view of an assignment example of a process A. When the OS 911 detects an assignment instruction for the process A, the OS 911 retrieves the CP of the process A from the table 700 and thereby acquires the CP of the process A. The OS 911 identifies a CPU having an App greater than or equal to the CP of the process A. In this example, the CPU #0 is identified. The OS 911 assigns the process A to the identified CPU #0.

Figure 16:
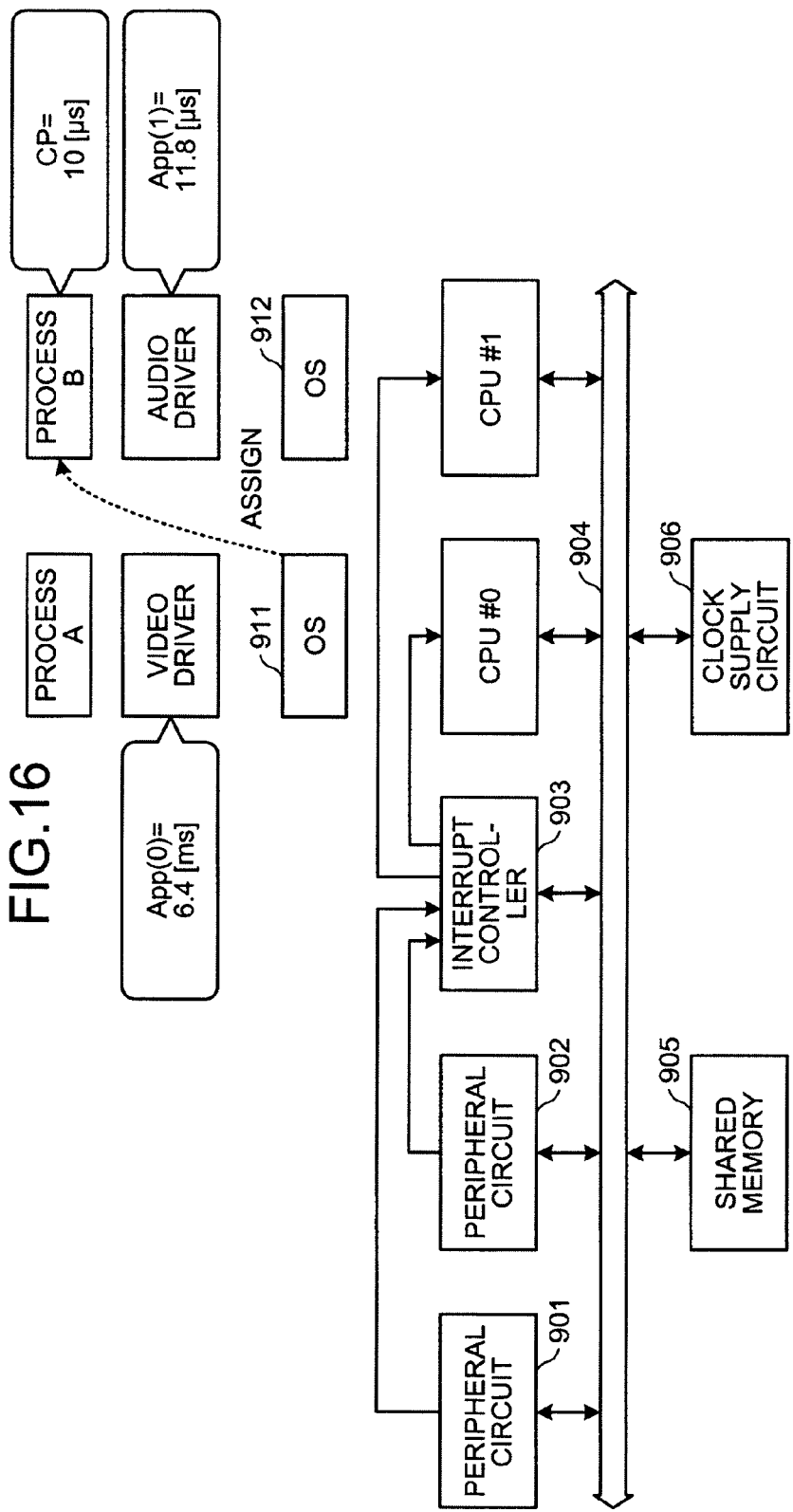
FIG. 16 is an explanatory view of an assignment example of a process B.

FIG. 16 is an explanatory view of an assignment example of a process B. When the OS 911 detects an assignment instruction for the process B, the OS 911 retrieves the CP of the process B from the table 700 and thereby acquires the CP of the process B. The OS 911 identifies a CPU having an App greater than or equal to the CP of the process B. In this example, the CPU #0 and the CPU #1 are identified. The OS 911 assigns the process B to the identified CPU #1.

Figure 17:
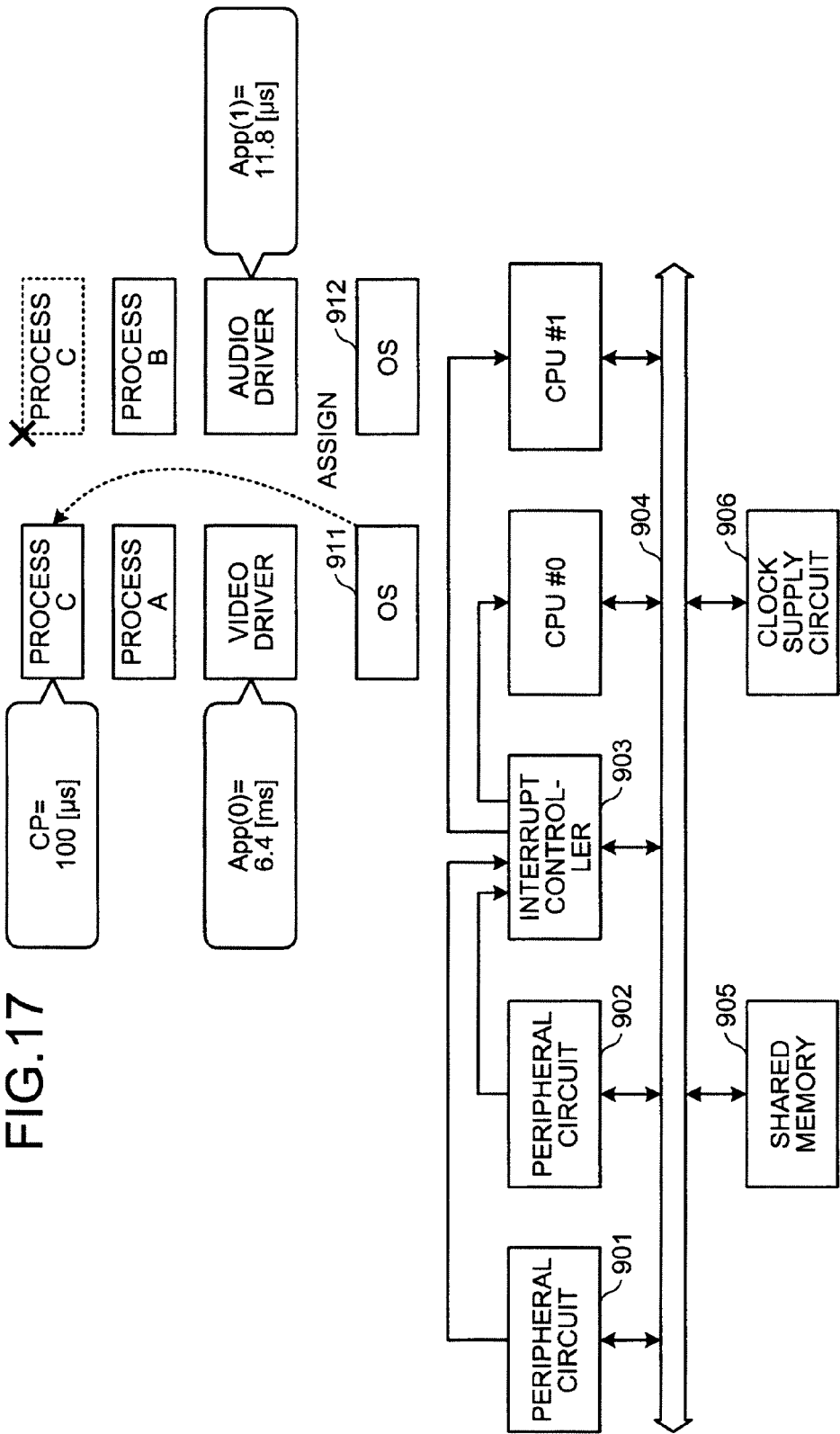
FIG. 17 is an explanatory view of an assignment example of a process C.

FIG. 17 is an explanatory view of an assignment example of a process C. When the OS 911 detects an assignment instruction for the process C, the OS 911 retrieves the CP of the process C from the table 700 and thereby acquires the CP of the process C. The OS 911 identifies a CPU having an App greater than or equal to the CP of the process C. In this example, the CPU #0 is identified. The OS 911 assigns the process C to the identified CPU #0.

FIG. 18 is a flowchart of a calculation process procedure. Although the App calculation process is executed be each of the OSs, the OS 912 is taken as an example in the description. First, the OS 912 determines whether driver assignment has been completed (step S1801). If determining that driver assignment has not been completed (step S1801: NO), the OS 912 returns to step S1801. If determining that driver assignment has been completed (step S1801: YES), the OS 912 acquires the CPs and Dts for all the assigned drivers (step S1802).

The OS 912 calculates the total CP value of all the assigned drivers (step S1803) and detects the shortest Dt among the Dts of the assigned drivers (step S1804). The OS 912 calculates App=the shortest Dt−the total CP value (step S1805) and notifies the master OS of App and the total CP value (step S1806).

FIG. 19 is a flowchart of an assignment process procedure 1 by the master OS. First, the master OS, i.e., the OS 911, determines whether a process assignment instruction has been received (step S1901). If determining that a process assignment instruction has not been received (step S1901: NO), the OS 911 returns to step S1901. On the other hand, if determining that a process assignment instruction has been received (step S1901: YES), the OS 911 acquires a CP of a process of the received assignment instruction (step S1902).

The OS 911 sets i=0 (step S1903) and determines whether a CPU #i is present (step S1904). If determining that the CPU #i is present (step S1904: YES), the OS 911 calculates SUB=App of the CPU #i−the acquired CP (step S1905) and determines whether SUB≥0 is satisfied (step S1906).

If determining that SUB≥0 is satisfied (step S1906: YES), the OS 911 identifies the CPU #i as a CPU to which assignment can be made (step S1907), correlates and outputs the CPU #i with SUB (step S1908), and sets i=i+1 (step S1909). On the other hand, if determining that SUB≥0 is not satisfied (step S1906: NO), the OS 911 goes to step S1909.

If determining that the CPU #i is not present (step S1904: NO), the OS 911 determines whether multiple identified CPUs are present (step S1910). If determining that multiple identified CPUs are present (step S1910: YES), the OS 911 identifies the CPU having the largest SUB among the identified CPUs (step S1911), assigns the process to the identified CPU (step S1912), and returns to step S1901.

If determining that multiple identified CPUs are not present (step S1910: NO), the OS 911 assigns the process to the identified CPU (step S1913) and returns to step S1901.

FIG. 20 is a flowchart of an assignment process procedure 2 by the OS 911. First, the OS 911 determines whether a process assignment instruction has been received (step S2001). If determining that a process assignment instruction has not been received (step S2001: NO), the OS 911 returns to step S2001. On the other hand, if determining that a process assignment instruction has been received (step S2001: YES), the OS 911 acquires a CP of a process of the received assignment instruction (step S2002).

The OS 911 sets i=0 (step S2003) and determines whether a CPU #i is present (step S2004). If determining that the CPU #i is present (step S2004: YES), the OS 911 determines whether App of the CPU #i≥the acquired CP is satisfied (step S2005). If determining that App of the CPU #i≥the acquired CP is satisfied (step S2005: YES), the OS 911 assigns the process to the CPU #i (step S2006) and returns to step S2001.

If determining that App of the CPU #i≥the acquired CP is not satisfied (step S2005: NO), the OS 911 sets i=i+1 (step S2007) and returns to step S2004. If determining that the CPU #i is not present at step S2004 (step S2004: NO), the OS 911 outputs an error message (step S2008) and returns to step S2001.

An example of lowering the clock frequency supplied to a CPU having no assigned process will be described.

FIG. 21 is a functional diagram of the multicore processor system 900 for a clock frequency. Each OS of the multicore processor system 900 has a detecting unit, a judging unit, an acquiring unit, a determining unit, and a setting unit. The OS 911 has a detecting unit 2101, a judging unit 2102, an acquiring unit 2103, a determining unit 2104, and a setting unit 2105; and the OS 912 has a detecting unit 2111, a judging unit 2112, an acquiring unit 2113, a determining unit 2114, and a setting unit 2115. CPUs load respective OSs from the shared memory 905 and execute processing coded in the OSs.

The detecting unit 2101 is the same processing as the detecting unit 2111 and the judging unit 2102 is the same processing as the judging unit 2112. The acquiring unit 2103 is the same processing as the acquiring unit 2113; the determining unit 2104 is the same processing as the determining unit 2114; and the setting unit 2105 is the same processing as the setting unit 2115. The detecting unit 2101 to the setting unit 2105 are taken as an example in the description.

The detecting unit 2101 detects for termination of a process assigned to an arbitrary CPU in the multicore processor. In this example, the arbitrary CPU is the CPU #0.

If the detecting unit 2101 detects the termination of the assigned process, the judging unit 2102 judges whether no process is assigned to the arbitrary CPU.

If the judging unit 2102 judges that no process is assigned to the CPU #0, the acquiring unit 2103 acquires the remaining time obtained by subtracting a processing time of interrupt processing assigned to the CPU #0 from a period from the calling time of the interrupt processing to the execution time limit of the interrupt processing. This remaining time is denoted by App.

The determining unit 2104 determines the frequency of a clock supplied to the CPU #0, based on a ratio between the remaining time acquired by the acquiring unit 2103 and the processing time of the interrupt processing.

The setting unit 2105 gives to a clock supply source, the determination result obtained by the determining unit 2104. In this example, the clock supply source is the clock supply circuit 906. Therefore, for example, the CPU #0 sets the determination result in a register corresponding to the frequency of the clock applied to the CPU #0 among the registers in the clock supply circuit 906.

The detecting unit 2101 also detects for assignment of an unassigned process to the CPU #0.

If the detecting unit 2101 detects assignment of an unassigned process to the CPU #0, the setting unit 2105 gives a frequency defined by the specification of the CPU #0 to the clock supply source.

For example, it is assumed that the CPU #0 has App of 6.4 [ms] and the total CP value of 10.2 [ms]. In this case, since the CPU #0 has surplus capability from 10.2 [ms] to 6.4 [ms], the clock can be lowered until the surplus capability becomes zero. It is assumed that CMAX denotes the frequency of the clock defined by the specification of the CPU #0 and supplied to the CPU #0. In this case, the frequency of the clock applied to the CPU #0 can be lowered to C.

$$C = CMAX \cdot \{1 - App/\text{total } CP \text{ value}\}$$

If CMAX is 100 MHz, the following is obtained.

$$C = 100 \cdot \{1 - 6.4/10.2\} = 37.25 \text{ [MHz]}$$

CMAX of each CPU is assumed to be retained in the shared memory 905. Detailed processing will be described with reference to a flowchart.

FIG. 22 is a flowchart of a clock frequency control process procedure of an OS. Although the control process is executed by each OS, the OS 911 is taken as an example in the description. First, the OS 911 determines if assignment of a process or execution termination of a process has been detected (step S2201). If determining that assignment of a process and execution termination of a process have not been detected (step S2201: NO), the OS 911 returns to step S2201.

If determining that assignment of a process has been detected (step S2201: ASSIGNMENT OF PROCESS), the OS 911 acquires the frequency (CMAX) of the clock defined by the specification (step S2202). The OS 911 can detect assignment of a process by reference to the process management table 922.

The OS 911 gives CMAX to the clock supply circuit 906 (step S2203) and returns to step S2201. Giving CMAX to the clock supply circuit 906 means that the register corresponding to the frequency of the clock applied to the CPU #0 in the clock supply circuit 906 is set to CMAX.

On the other hand, if determining that the execution termination of a process is detected (step S2201: EXECUTION TERMINATION OF PROCESS), the OS 911 determines whether an assigned process is present (step S2204). The OS 911 can detect termination of a process by referring to the process management table 922.

If determining that an assigned process exists (step S2204: YES), the OS 911 returns to step S2201. If determining that an assigned process is not present (step S2204: NO), the OS 911 acquires the frequency (CMAX) of the clock defined by the specification (step S2205).

The OS 911 calculates C=CMAX×(1−App/total CP value) (step S2206) and gives C to the clock supply circuit 906 (step S2207). Giving C to the clock supply circuit 906 means that the register corresponding to the frequency of the clock applied to the CPU #0 in the clock supply circuit 906 is set to C.

As described, according to the multicore processor system, the assigning program, and the assigning method, whether a process is assigned to an arbitrary core is determined by determining whether interrupt processing assigned to the arbitrary core can meet the execution time limit from the time of calling of the interrupt processing, on the assumption that the process is assigned to the arbitrary core. As a result if a process defined to disable interrupt is assigned, the execution time limit from the time of calling of the interrupt processing can be met. Therefore, it is not necessary to establish a CPU dedicated to drivers.

As described, according to the multicore processor system, the assigning program, and the assigning method, an execution time of given interrupt processing is added to the execution time(s) of the interrupt processing assigned to an arbitrary core. Whether the given interrupt processing can be assigned to the arbitrary core is determined by determining whether the given interrupt processing and the assigned interrupt processing can meet the respective execution time limits from the times of calling based on the sum. As a result, even if multiple interrupt processing sessions are called at the same time, the execution time limits from the times of calling of the interrupt processing sessions can be met.

The shortest period is identified from among a period of the given interrupt processing from the calling time to the execution time limit and periods of the assigned interrupt processing from the calling times to the execution time limits of the respective assigned interrupt processing sessions. It is then determined whether the identified shortest period is less than or equal to the sum. This enables determination of whether the given interrupt processing and the assigned interrupt processing sessions can meet the respective execution time limits from the times of calling. Therefore, the determination processing can be accelerated and the interrupt processing can rapidly be assigned.

As described, according to the multicore processor system, the control program, and the control method, when execution termination of an assigned process assigned to an arbitrary CPU is detected, it is determined whether no process is assigned to the arbitrary CPU. If no process is assigned, the frequency of the clock applied to the arbitrary CPU is determined based on the execution time limit from the time of calling of the interrupt processing assigned to the arbitrary CPU. As a result, lower power consumption can be achieved while meeting the deadline times of drivers.

When assignment of an unassigned process to the arbitrary CPU is detected, the frequency of the clock applied to the arbitrary CPU is returned to the frequency defined by the specification. As a result, the deadline times of drivers can be met.

The multicore processor system, the assigning program, and the assigning method enable a process to be assigned to a CPU that is capable of meeting a deadline time of a driver. With the multicore processor system, the assigning program, and the assigning, even if multiple drivers are called, the deadline times of the drivers can be met. The multicore processor system, the control program, and the control method enable lower power consumption to be achieved while meeting the deadline times of the drivers.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-processor system comprising:
   a plurality of cores executing an assigned interrupt processing; and
   a storage storing execution time information of each interrupt processing and execution time limit information of each interrupt processing; wherein
   a first core of the plurality of cores is configured to:
   calculate each total processing time of an interrupt processing that has been assigned to each core of the plurality of cores and a first interrupt processing based on the execution time information stored in the storage when the first interrupt processing is detected, and
   assign the first interrupt processing to an arbitrary core for which a shortest time among a time to an execution time limit of the first interrupt processing based on the execution time limit information stored in the storage and a time to an execution time limit for each interrupt processing that has been assigned based on the execution time limit information stored in the storage being equal to or less than the total processing time.

2. A method for controlling a multi-processor system comprising a plurality of cores executing an assigned interrupt processing and a storage storing execution time information of each interrupt processing and execution time limit information of each interrupt processing, executed by a first core of the plurality of cores, the method comprising:
   calculating each total processing time of an interrupt processing that has been assigned to each core of the plurality of cores and a first interrupt processing based on the execution time information stored in the storage when the first interrupt processing is detected, and
   assigning the first interrupt processing to an arbitrary core for which a shortest time among a time to an execution time limit of the first interrupt processing based on the execution time limit information stored in the storage and a time to an execution time limit for each interrupt processing that has been assigned being equal to or less than the total processing time.

3. A non-transitory computer-readable recording medium storing a program for controlling a multicore processor system comprising a plurality of cores executing an assigned interrupt processing and a storage storing execution time information of each interrupt processing and execution time limit information of each interrupt processing, that causes a first core of the plurality of cores to execute a process comprising:
   calculating each total processing time of an interrupt processing that has been assigned to each core of the plurality of cores and a first interrupt processing based on the execution time information stored in the storage when the first interrupt processing is detected, and
   assigning the first interrupt processing to an arbitrary core for which a shortest time among a time to an execution time limit of the first interrupt processing based on the execution time limit information stored in the storage and a time to an execution time limit for each interrupt processing that has been assigned based on the execution time limit information stored in the storage being equal to or less than the total processing time.

* * * * *